(12) United States Patent
Ogawa et al.

(10) Patent No.: US 10,921,818 B2
(45) Date of Patent: *Feb. 16, 2021

(54) ROBOT

(71) Applicant: Panasonic Intellectual Property Management Co., Ltd., Osaka (JP)

(72) Inventors: Kento Ogawa, Osaka (JP); Seiya Higuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 309 days.

This patent is subject to a terminal disclaimer.

(21) Appl. No.: 16/058,439

(22) Filed: Aug. 8, 2018

(65) Prior Publication Data

US 2019/0094874 A1 Mar. 28, 2019

(30) Foreign Application Priority Data

Sep. 22, 2017 (JP) .................. 2017-182234

(51) Int. Cl.
*G05D 1/02* (2020.01)
*G05D 1/00* (2006.01)
*G05D 1/08* (2006.01)
(52) U.S. Cl.
CPC ......... *G05D 1/0246* (2013.01); *G05D 1/0088* (2013.01); *G05D 1/027* (2013.01);
(Continued)
(58) Field of Classification Search
CPC ......... G07F 17/3297; A61B 17/320092; A61B 2017/003; A61B 2017/00398;
(Continued)

(56) References Cited

U.S. PATENT DOCUMENTS 6,896,078 B2 * 5/2005 Wakui ................. B25J 5/007
180/212
10,307,911 B2 * 6/2019 Higuchi ............... B25J 11/0005
(Continued)

FOREIGN PATENT DOCUMENTS

JP 2014-021625 2/2014
JP 2017-102538 6/2017

OTHER PUBLICATIONS

Anwar et al., Conceptual of spherical robot, 2014, IEEE, p. 547-550 (Year: 2014).*

(Continued)

*Primary Examiner* — McDieunel Marc
(74) *Attorney, Agent, or Firm* — Greenblum & Bernstein, P.L.C.

(57) ABSTRACT

A robot includes a range finding sensor that measures a distance from the robot to an object facing a display each time the range finding sensor rotates through a predetermined angle. If a difference between a first distance previously measured and a second distance subsequently measured is a first predetermined value or greater, information is stored in a memory to indicate that a down-step is located in a direction defined by a turning angle of the robot when the first distance is measured at a position that is separated from the robot by the first distance. When rotating and moving the main casing in a direction in which the down-step is located, the robot is caused to make a pivot turn first. Subsequently, the main casing is rotated to move in the direction in which the down-step is located by a distance smaller than the first distance.

14 Claims, 20 Drawing Sheets

(52) U.S. Cl.
CPC ......... *G05D 1/0238* (2013.01); *G05D 1/0255* (2013.01); *G05D 1/0891* (2013.01); *G05D 2201/0214* (2013.01)

(58) Field of Classification Search
CPC .... A61B 17/320068; A61B 2017/2927; A61G 2203/36; A63F 5/02; G01M 1/045; G05D 1/0238; G05D 1/0246; G05D 1/0255; G05D 1/0891; G05D 2201/0214; G05D 1/0088
See application file for complete search history.

(56) References Cited

U.S. PATENT DOCUMENTS

| | | | | |
|---|---|---|---|---|
| 10,478,971 | B2* | 11/2019 | Ogawa | B25J 11/0015 |
| 10,507,400 | B2* | 12/2019 | Higuchi | B25J 11/0005 |
| 10,589,426 | B2* | 3/2020 | Kou | G06N 3/008 |
| 2004/0182614 | A1* | 9/2004 | Wakui | G06N 3/008 |
| | | | | 180/7.1 |
| 2017/0153638 | A1 | 6/2017 | Kawamura et al. | |
| 2018/0056519 | A1* | 3/2018 | Ogawa | A63H 5/00 |
| 2018/0169865 | A1* | 6/2018 | Kou | A63H 33/005 |
| 2018/0185764 | A1* | 7/2018 | Miyazaki | G05D 1/0891 |
| 2019/0015758 | A1* | 1/2019 | Higuchi | A63H 33/005 |
| 2019/0061161 | A1* | 2/2019 | Higuchi | G05D 1/0255 |
| 2020/0183410 | A1* | 6/2020 | Kim | G05D 1/0246 |

OTHER PUBLICATIONS

Zhong et al., Testing and modelling of a biomimetric swimmer, 2012, IEEE, p. (Year: 2012).*
Kumagai, Development of a ball drive unit using partially sliding rollers—An alternative mechanism for semi-omnidirectional motion, 2010, IEEE, p. 2010 (Year: 2010).*
Li et al., A spherical hopping robot for exploration in complex environments, 2010, IEEE, p. 402-407 (Year: 2010).*

* cited by examiner

| TURN DIFFERENCE ANGLE θ (DEGREES) | DISTANCE (cm) | DOWN-STEP (0: NO, 1: YES) |
|---|---|---|
| 0 | 30 | 0 |
| 45 | 130 | 0 |
| 90 | 120 | 1 |
| 135 | 150 | 1 |
| 180 | 50 | 1 |
| 225 | 60 | 1 |
| 270 | 25 | 1 |
| 315 | 35 | 0 |

FIG. 15

| PIVOT TURN BEHAVIORAL STATE | STATE OF ROBOT | CONTROL AMOUNT SET FOR WEIGHT DRIVE MECHANISM | CONTROL AMOUNT SET FOR SECOND DRIVE MECHANISM |
|---|---|---|---|
| 1 | 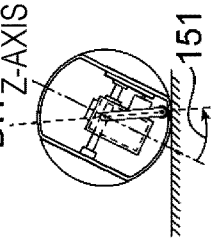 | RIGHT ROTATION CONTROL AMOUNT | STOP CONTROL AMOUNT |
| 2 | 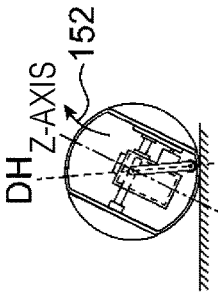 | RIGHT ROTATION CONTROL AMOUNT | ACCELERATION CONTROL AMOUNT IN FORWARD DIRECTION |
| 3 | 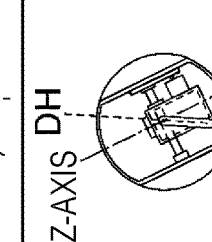 | LEFT ROTATION CONTROL AMOUNT | STOP CONTROL AMOUNT |
| 4 | 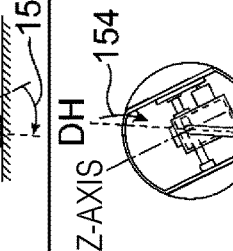 | LEFT ROTATION CONTROL AMOUNT | ACCELERATION CONTROL AMOUNT IN BACKWARD DIRECTION |

ROBOT

BACKGROUND

1. Technical Field

The present disclosure relates to a robot.

2. Description of the Related Art

Japanese Unexamined Patent Application Publication No. 2014-21625 describes a technique for detecting a depression in the travel surface by using a range finding sensor that measures the distance from the range finding sensor to an object to be measured and located in front of a robot in the travel direction and controlling the robot not to enter the detected depression.

In order to prevent an autonomous mobile device from falling from a high place, Japanese Unexamined Patent Application Publication No. 2017-102538 describes a technique for obtaining, as the height difference between the autonomous mobile device and a floor surface, the height difference between the autonomous mobile device and a floor surface calculated from a difference between data measured by an atmospheric pressure sensor and a reference atmospheric pressure or the height difference calculated by doubly integrating the data measured by the acceleration sensor when the autonomous mobile device is lifted from the floor surface. If the obtained height difference is greater than or equal to a predetermined value, the autonomous mobile device is rotated only at that position.

SUMMARY

However, the above-mentioned existing techniques require further improvement.

In one general aspect, the techniques disclosed here feature a robot including a spherical band-shaped main casing generated by cutting off a first side portion and a second side portion facing the first side portion out of a spherical body, a first spherical cap portion corresponding to the first side portion, a second spherical cap portion corresponding to the second side portion, a shaft that joins the first spherical cap portion to the second spherical cap portion, a display portion that is attached to the shaft via an arm and that displays at least part of a face of the robot, a weight that is provided inside the main casing and that rotates around a shaft of the weight perpendicular to the shaft, a first drive mechanism that rotates the first spherical cap portion and the second spherical cap portion by rotation of the shaft, a second drive mechanism independent from the first drive mechanism, where the second drive mechanism rotates the main casing about the shaft, a weight drive mechanism that rotates the weight around the shaft of the weight, a range finding sensor disposed in one of the first spherical cap portion and the second spherical cap portion so as to be facing the same side as the display portion, a gyro sensor that measures a turning angle of the robot about an axis perpendicular to a plane including the shaft and detects shaking of the robot, a memory, and a control circuit. The control circuit controls the first drive mechanism to rotate the range finding sensor around the shaft in at least one of an upward direction and a downward direction in increments of a predetermined angle. The range finding sensor measures a distance from the range finding sensor to an object located on the side the display portion is facing each time the range finding sensor rotates through the predetermined angle. If a difference between a first distance previously measured and a second distance subsequently measured is greater than or equal to a first predetermined value, the control circuit stores, in the memory, information indicating that there is a down-step in a direction defined by the turning angle of the robot when the first distance is measured at a position the first distance away from the range finding sensor. In order to rotate the main casing and move the main casing in the direction in which the down-step is located, the control circuit performs the following operation a predetermined number of times: controlling the second drive mechanism to stop rotation of the main casing, controlling the weight drive mechanism to tilt the weight to a first side that is one of a right hand side and a left hand side as viewed in a direction in which the display portion is facing, controlling the second drive mechanism to move the main casing forward with the weight tilted to the first side, controlling the second drive mechanism to stop the rotation of the main casing, tilting the weight to a second side different from the first side, and controlling the second drive mechanism to move the main casing backward with the weight tilted to the second side, so that the robot turns in the direction in which the down-step is located. The control circuit rotates the main casing so that the robot moves forward in the direction in which the down-step is located by a distance that is smaller than the first distance.

According to the present disclosure, the above-mentioned existing techniques can be further improved.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14 illustrates an example of the data structure of the down-step information table;

FIG. 15 illustrates the state of the robot when a pivot turn process is performed;

DETAILED DESCRIPTION

Figure 1A:
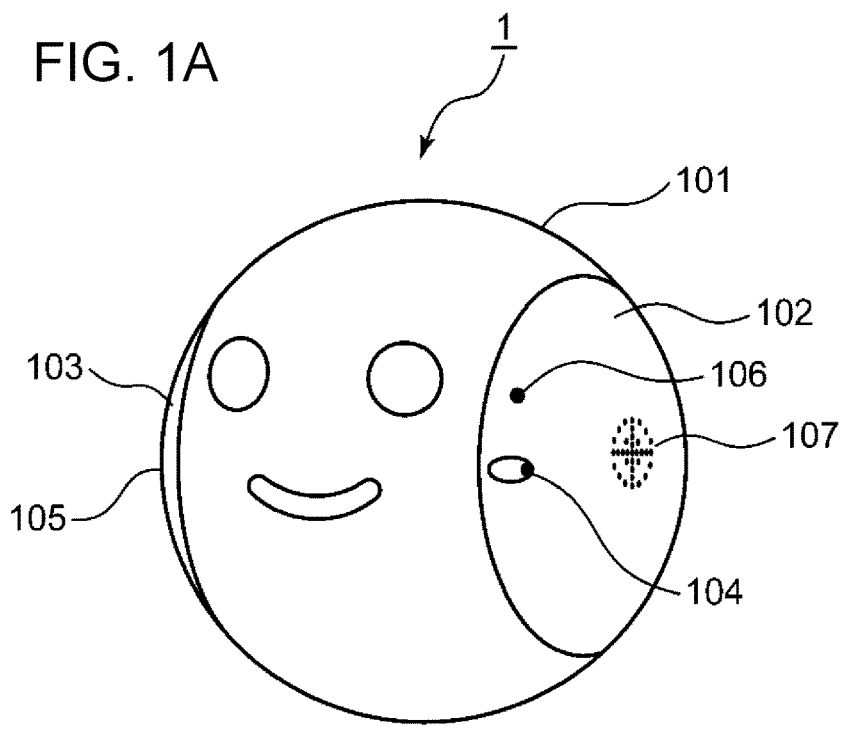
FIG. 1A is an external perspective view of a robot according to an embodiment of the present disclosure.

Underlying Knowledge Forming Basis of the Present Disclosure

The present inventor has studied a spherical robot that has a spherical shell and that autonomously moves inside a room, such as a room in a house, by rolling the spherical shell.

If such a spherical robot is placed on a high place, such as a desk, the robot may be at the risk of falling from the high place and malfunctioning. The risk of falling from a high place needs to be eliminated beforehand. For this purpose, it is necessary for the spherical robot to detect a down-step where the height difference in the travel surface abruptly changes and to travel while passing around the down-step.

At this time, if movement of the spherical robot toward a down-step is inhibited at all times in order to prevent the spherical robot from falling from the down-step, the spherical robot cannot move on a high place surrounded by down-steps (e.g., a desk).

If the spherical robot is allowed to move at all times, it makes the robot behave like a pet. Accordingly, a user becomes increasingly emotionally attached to the spherical robot. Therefore, it is desirable to avoid limiting the autonomous movement of the spherical robot if at all possible. For this purpose, even when the spherical robot is surrounded by down-steps, it is necessary to turn the spherical robot to an azimuth where the danger is minimized and cause the spherical robot to travel in that direction.

The spherical robot to be studied by the present inventor includes a pair of spherical cap portions, a shaft that joins the two spherical cap portions to each other, a display portion attached to the shaft, a main casing rotatably mounted on the shaft. The spherical robot is configured to travel on the ground by rotating the main casing about the shaft. In addition, if the spherical robot rotates the shaft, the display portion and the pair of spherical cap portions rotate in the pitch direction together with the shaft. Thus, the spherical robot can change the direction in which the display portion is facing around the shaft. In this example, the pair of spherical cap portions includes a range finding sensor for measuring a distance from the sensor to an object located in front of the spherical robot. In addition, images representing the eyes and mouth of the robot are displayed on the display portion. In this way, the spherical robot can change the direction of the images of the eyes and mouth and the direction of the optical axis of the range finding sensor by rotating the pair of spherical cap portions about the shaft.

By using the spherical robot that remained stationary at a given place, the present inventor monitored the measurement value of the range finding sensor while changing the direction of the optical axis of the range finding sensor about the shaft and has found that the measurement value of the range finding sensor abruptly changed at a down-step. For example, when the optical axis of the range finding sensor is oriented to the floor surface and, thereafter, the rotation angle of the optical axis about the shaft is gradually increased, the measurement value of the range finding sensor gradually increases until the optical axis reaches the position of the down-step. When the optical axis reaches the position of the down-step, the measurement value of the range finding sensor abruptly increases as compared with the previous measurement values.

Japanese Unexamined Patent Application Publication No. 2014-21625 describes a technique for detecting a depression by using a range finding sensor. The range finding sensor is disposed at a position separated vertically by a predetermined distance from the floor surface to be cleaned by a cleaning robot. In addition, the range finding sensor is mounted so as to face downward from the horizontal. However, Japanese Unexamined Patent Application Publication No. 2014-21625 does not include any description of a range finding sensor having an optical axis that is changeable in the pitch direction. In addition, in Japanese Unexamined Patent Application Publication No. 2014-21625, a depression is detected by using an equation based on the coordinate values of the range finding sensor and the floor surface. Accordingly, complicated calculation is required and, thus, a large number of processing steps are required.

In Japanese Unexamined Patent Application Publication No. 2017-102538, the height difference is detected by using an acceleration sensor or an atmospheric pressure sensor, and use of a range finding sensor is not described. That is, Japanese Unexamined Patent Application Publication No. 2017-102538 does not include a technical idea of detecting the height difference by rotating the optical axis of the range finding sensor in the pitch direction.

As described above, Japanese Unexamined Patent Application Publication Nos. 2014-21625 and 2017-102538 do not mention or suggest the findings of the present inventor at all.

Spherical robots have such characteristics that they can change the optical axis of the range finding sensor in the pitch direction along with rotation of the spherical cap portions thereof. The present disclosure provides a technique for detecting a down-step by using the characteristics and causing spherical robots to travel without falling from the detected down-step.

(1) According to an aspect of the present disclosure, a robot includes a spherical band-shaped main casing generated by cutting off a first side portion and a second side portion facing the first side portion out of a spherical body, a first spherical cap portion corresponding to the first side portion, a second spherical cap portion corresponding to the second side portion, a shaft that joins the first spherical cap portion to the second spherical cap portion, a display portion that is attached to the shaft via an arm and that displays at least part of a face of the robot, a weight that is provided inside the main casing and that rotates around a shaft of the weight perpendicular to the shaft, a first drive mechanism that rotates the first spherical cap portion and the second spherical cap portion by rotation of the shaft, a second drive mechanism independent from the first drive mechanism, where the second drive mechanism rotates the main casing about the shaft, a weight drive mechanism that rotates the weight around the shaft of the weight, a range finding sensor disposed in one of the first spherical cap portion and the second spherical cap portion so as to be facing the same side as the display portion, a gyro sensor that measures a turning angle of the robot about an axis perpendicular to a plane including the shaft and detects shaking of the robot, a memory, and a control circuit. The control circuit controls the first drive mechanism to rotate the range finding sensor around the shaft in at least one of an upward direction and a downward direction in increments of a predetermined angle. The range finding sensor measures a distance from the range finding sensor to an object located on the side the display portion is facing each time the range finding sensor rotates through the predetermined angle. If a difference between a first distance previously measured and a second distance subsequently measured is greater than or equal to a first predetermined value, the control circuit stores, in the memory, information indicating that there is a down-step in a direction defined by the turning angle of the robot when the first distance is measured at a position the first distance away from the range finding sensor. In order to rotate the main casing and move the main casing in the direction in which the down-step is located, the control circuit performs the following operation a predetermined number of times: controlling the second drive mechanism to stop rotation of the main casing, controlling the weight drive mechanism to tilt the weight to a first side that is one of a right hand side and a left hand side as viewed in a direction in which the display portion is facing, controlling the second drive mechanism to move the main casing forward with the weight tilted to the first side, controlling the second drive mechanism to stop the rotation of the main casing, tilting the weight to a second side different from the first side, and controlling the second drive mechanism to move the main casing backward with the weight tilted to the second side, so that the robot turns in the direction in which the down-step is located. Subsequently, the control circuit rotates the main casing so that the robot moves forward in the direction in which the down-step is located by a distance that is smaller than the first distance.

According to the present aspect, each time the range finding sensor rotates through a predetermined angle, the distance from the range finding sensor to the object present on the side the display portion is facing is measured. If the distance between the first distance measured previously and the second distance measured subsequently is greater than or equal to the first predetermined value, information indicating that a down-step is located at the position the first distance away from the robot in a direction defined by the turning angle of the robot when the first distance is measured is stored in the memory.

In this way, according to the present aspect, a down-step can be detected by using the characteristics of a spherical robot that the optical axis of the range finding sensor can be changed in conjunction with the rotation of the spherical cap portion in the pitch direction.

In addition, according to the present aspect, in order to rotate the main casing and move the main casing in the direction in which the down-step is located, the control circuit performs the following operation a predetermined number of times: controlling the second drive mechanism to stop rotation of the main casing, controlling the weight drive mechanism to tilt the weight to a first side that is one of a right hand side and a left hand side as viewed in the direction in which the display portion is facing, controlling the second drive mechanism to move the main casing forward with the weight tilted to the first side, controlling the second drive mechanism to stop the rotation of the main casing, tilting the weight to a second side different from the first side, and controlling the second drive mechanism to move the main casing backward with the weight tilted to the second side, so that the robot turns in the direction in which the down-step is located.

In this way, according to the present aspect, by turning with a turning radius smaller than in a normal turn, the robot can turn in the direction in which the down-step is located. As a result, according to the present aspect, even when the robot is positioned at a dangerous place from which the robot is highly likely to fall (e.g., a corner of a desk), the robot can be prevented from falling from the place by turning with a small turning radius. Hereinafter, the turn with a small turning radius is referred to as a "pivot turn", and the process to cause the robot to make a pivot turn is referred to as a "pivot turn process".

Furthermore, according to the present aspect, to move the robot in a direction in which a down-step is located, the main casing is rotated and, thus, the robot is moved by a distance smaller than the first distance which is the distance from the robot to the down-step. In this manner, the robot can be prevented from falling from the down-step located ahead of its destination of movement.

(2) According to the above-described aspect, if the value indicating shaking of the robot detected by the gyro sensor remain unchanged for a predetermined period of time, the control circuit may determine that the robot is placed on a flat plane. The control circuit may control the second drive mechanism to stop forward movement and backward movement of the robot and control the weight drive mechanism to stop rotation of the weight, and the range finding sensor may measure a distance from the range finding sensor to an object located on a side the display portion is facing each time the range finding sensor rotates through the predetermined angle.

According to the present aspect, when the robot is placed on a flat surface, the rotation of the weight is stopped with the forward movement and the backward movement of the robot stopped. Thus, the posture of the robot is returned to a normal posture so as not to tilt to the right or left, and the robot is stationary. According to the present aspect, after the robot enters such a state, a distance from the range finding sensor to the object located on the side the display portion is facing is measured each time the range finding sensor rotates through the predetermined angle. As a result, the down-step can be accurately measured.

(3) According to the above aspect, if the difference between the first distance and the second distance is less than the first predetermined value, the control circuit may store, in the memory, information indicating that there is no down-step in a direction defined by the turning angle of the robot when the first distance is measured.

According to the present aspect, the information indicating that there is no down-step in a direction defined by the turning angle of the robot when the first distance is measured is stored in the memory if the difference between the first distance and the second distance is less than the first predetermined value. As a result, the robot can perform control on the assumption that there is no down-step in the direction defined by the corresponding turning angle.

(4) According to the above aspect, the control circuit may determine that the robot is placed on a flat surface if the value indicating shaking of the robot detected by the gyro sensor remains unchanged for a predetermined period of time, control the second drive mechanism to stop forward movement and backward movement of the robot, and control the weight drive mechanism to stop rotation of the weight. A first turning angle may be defined as a turning angle of the robot when rotation of the weight is stopped with the forward movement and backward movement of the robot stopped. To rotate the robot from a position corresponding to the first turning angle to a position corresponding to a second turning angle representing the next turning angle obtained by adding a predetermined unit turning angle to the first turning angle and determine whether a down-step is located in a direction corresponding to the second turning angle, the control circuit may perform the following operation a predetermined number of times: controlling the second drive mechanism to stop rotation of the main casing, controlling the weight drive mechanism to tilt the weight to a first side that is one of a right hand side and a left hand side as viewed in the direction in which the display portion is facing, controlling the second drive mechanism to move the main casing forward with the weight tilted to the first side, controlling the second drive mechanism to stop the rotation of the main casing, tilting the weight to a second side different from the first side, controlling the second drive mechanism to move the main casing backward with the weight tilted to the second side, so that the robot is turned to face the direction corresponding to the second turning angle. Subsequently, the control circuit may control the first drive mechanism to rotate the range finding sensor around the shaft in at least one of the upward direction and downward direction in increments of the predetermined angle, and the range finding sensor may measure a distance from the range finding sensor to an object located on a side the display portion is facing each time the range finding sensor rotates through the predetermined angle.

According to the present aspect, when the robot is placed on a flat surface, the posture of the robot returns to the normal state, and the robot is stationary. Thereafter, the pivot turn process is repeated and, thus, the robot is turned from the first turning angle to the second turning angle. In the direction defined by the second turning angle, distance measurement is performed each time the range finding sensor rotates through the predetermined angle, and the presence or absence of a down-step is detected.

As a result, according to the present aspect, the presence or absence of a down-step and the distance from the range finding sensor to the down-step can be detected not only in the first turning direction but in the second turning direction. Thereafter, the robot can manage the presence or absence of a down-step and the distance. In addition, according to the present aspect, by detecting the presence or absence of a down-step and the distance to the down-step in a plurality of second turning directions, the presence or absence of a down-step and the distance to the down-step in a plurality of directions can be detected, and the robot can manage the information.

(5) According to the above aspect, when the control circuit determines that the robot is placed on the flat surface and defines the first turning angle as the turning angle of the robot when stopping the rotation of the weight with the forward movement and backward movement of the robot stopped, the control circuit may continue the process to determine whether there is a down-step until the robot turns 360 degrees from the first turning angle in increments of the predetermined unit turning angle.

According to the present aspect, when the robot is placed on a flat surface, the process of determining the presence or absence of a down-step is continuously performed in increments of the predetermined unit turning angle until the robot turns 360 degrees from the first turning angle. Thus, it can be determined whether a down-step is located within a range of 360 degrees around the robot, and the robot can manage the information.

(6) According to the above-described aspect, the robot may further include a camera that captures an image of surroundings of the robot and a microphone that acquires a sound signal from the surroundings of the robot. If the control circuit determines that an image of a person is not included in the image captured by the camera and voice of the person is not included in the sound signal acquired by the microphone and that the down-step is located in 360 degree direction, the control circuit may rotate the main casing and move the main casing forward from a position of the robot in a direction in which the farthest down-step from the position of the robot is located by a distance that is smaller than a distance from the position of the robot to the farthest down-step.

If there is no person in the surroundings of the robot, it is desirable that the robot be moved in a direction in which falling of the robot from the down-step is most unlikely to occur. According to the present embodiment, when it is determined that there is no person in the surroundings of the robot by using the camera and the microphone and that there is a down-step in 360 degree direction around the robot, the robot is moved in a direction in which the farthest down-step from the position of the robot is located by a distance that is smaller than a distance from the position of the robot to the farthest down-step. As a result, the robot is prevented from falling from the down-step while the movement distance of the robot is maximized.

(7) According to another aspect of the present disclosure, a robot includes a spherical band-shaped main casing generated by cutting off a first side portion and a second side portion facing the first side portion out of a spherical body, a first spherical cap portion corresponding to the first side portion, a second spherical cap portion corresponding to the second side portion, a shaft that joins the first spherical cap portion to the second spherical cap portion, a display portion that is attached to the shaft via an arm and that displays at least part of a face of the robot, a weight that is provided inside the main casing and that rotates around a shaft of the weight perpendicular to the shaft, a first drive mechanism that rotates the first spherical cap portion and the second spherical cap portion by rotation of the shaft, a second drive mechanism independent from the first drive mechanism, where the second drive mechanism rotates the main casing about the shaft, a weight drive mechanism that rotates the shaft of the weight, a range finding sensor disposed in one of the first spherical cap portion and the second spherical cap portion so as to be facing the same side as the display portion, a gyro sensor that measures a turning angle of the robot about an axis perpendicular to a plane including the shaft and detects shaking of the robot, a camera that captures an image of surroundings of the robot, and a microphone that acquires a sound signal from the surroundings of the robot, a memory, and a control circuit. If the control circuit determines that an image of a person is included in the image captured by the camera or voice of the person is included in the sound signal acquired by the microphone, the control circuit performs the following operation a predetermined number of times: controlling the second drive mechanism to stop rotation of the main casing, controlling the weight drive mechanism to tilt the weight to a first side that is one of a right hand side and a left hand side as viewed in a direction in which the display portion is facing, controlling the second drive mechanism to move the main casing forward with the weight tilted to the first side, controlling the second drive mechanism to stop the rotation of the main casing, tilting the weight to a second side different from the first side, and controlling the second drive mechanism to move the main casing backward with the weight tilted to the second side, so that the robot is turned to a predetermined turning angle corresponding to a direction in which the person is located. Subsequently, the control circuit controls the first drive mechanism to rotate the range finding sensor around the shaft in at least one of an upward direction and a downward direction in increments of a predetermined angle. The range finding sensor measures a distance from the range finding sensor to an object located on the side the display portion is facing each time the range finding sensor rotates through the predetermined angle. If a difference between a first distance previously measured and a second distance subsequently measured is greater than or equal to a predetermined value, the control circuit determines that a down-step is located in a direction defined by the turning angle of the robot when the first distance is measured at a position the first distance away from the range finding sensor. Subsequently, the control circuit rotates the main casing and moves the main casing forward by a distance that is smaller than the first distance.

According to the present aspect, the presence or absence of a person in the surroundings is determined by using at least one of a camera and a microphone. According to the present aspect, if it is determined that there is a person in the surroundings, the robot is turned to face the direction in which the person is located through the pivot turn process and, thereafter, the range finding sensor is rotated in increments of the predetermined angle. In this manner, the presence or absence of a down-step and the distance from the range finding sensor to the down-step are detected. Subsequently, the robot is moved by a distance smaller than the distance from the range finding sensor to the detected down-step.

As a result, according to the present aspect, the robot can be moved towards the person while being prevented from falling from the down-step.

(8) According to the above aspect, the robot may further include a camera that captures an image of surroundings of the robot and a microphone that acquires a sound signal from the surroundings of the robot. After rotating the main casing and moving the main casing forward in a direction in which the down-step is located by a distance that is smaller than the first distance, the control circuit may determine whether an image of a person is included in the image captured by the camera or voice of the person is included in the sound signal acquired by the microphone. If the control circuit determines that an image of a person is included in the image captured by the camera or voice of the person is included in the sound signal acquired by the microphone, the control circuit may perform the following operation a predetermined number of times: controlling the second drive mechanism to stop rotation of the main casing, controlling the weight drive mechanism to tilt the weight to a first side that is one of a right hand side and a left hand side as viewed in the direction in which the display portion is facing, controlling the second drive mechanism to move the main casing forward with the weight tilted to the first side, controlling the second drive mechanism to stop the rotation of the main casing, tilting the weight to a second side different from the first side, and controlling the second drive mechanism to move the main casing backward with the weight tilted to the second side, so that the robot is turned to a predetermined turning angle corresponding to a direction in which the person is located. Subsequently, the control circuit may control the first drive mechanism to rotate the range finding sensor around the shaft in at least one of an upward direction and a downward direction in increments of the predetermined angle. The range finding sensor may measure a distance from the range finding sensor to an object located on the side the display portion is facing each time the range finding sensor rotates through the predetermined angle. If a difference between a third distance previously measured and a fourth distance subsequently measured is greater than or equal to a predetermined value, the control circuit may determine that a down-step is located in a direction defined by the turning angle of the robot when the third distance is measured at a position the third distance away from the range finding sensor. Subsequently, the control circuit may rotate the main casing and move the main casing forward by a distance that is smaller than the third distance.

According to the present aspect, after moving the robot by a distance smaller than the first distance in the direction in which the down-step is located, the presence or absence of a person present in the surroundings is determined by using at least one of the camera and the microphone. According to the present aspect, if it is determined that a person is present, the robot is turned to face the direction in which the person is located through the pivot turn process, and the range finding sensor is rotated in increments of the predetermined angle. Thus, the presence or absence of the down-step and the distance from the range finding sensor to the down-step are detected and, thereafter, the robot is moved by a distance smaller than the distance from the range finding sensor to the detected down-step.

As a result, according to the present aspect, the robot can be moved towards a person without falling from the down-step.

(9) According to the above aspect, the control circuit may determine whether voice of the person corresponding to an instruction to the robot is included in the sound signal acquired by the microphone within a predetermined period of time after rotating the main casing and moving the main casing forward by a distance that is smaller than the first distance. If the control circuit determines that a voice instruction to the robot is included in the sound signal acquired by the microphone, the control circuit may execute a task corresponding to the instruction.

According to the present aspect, when a person utters a voice instruction to the robot within a predetermined period of time after moving the robot towards a person, the robot executes a task corresponding to the instruction. As a result, according to the present aspect, a situation in which although the person instructs the robot to execute a task, the robot ignores the instruction and continues to travel can be prevented.

(10) According to the above aspect, the robot may further include a camera that captures an image of surroundings of the robot and a microphone that acquires a sound signal from the surroundings of the robot. If the control circuit determines that there is no down-step in a 360 degree direction and that an image of a person is not included in the acquired image and voice of the person is not included in the acquired sound signal, the control circuit may determine whether there is an obstacle in a direction in which the main casing is rotated and moved forward by using the range finding sensor. If the control circuit determines that there is an obstacle in the direction in which the main casing is rotated and moved forward, the control circuit may determine whether a distance from the robot to the obstacle is less than a second predetermined value. If the distance from the robot to the obstacle is less than the second predetermined value, the control circuit may control the second drive mechanism to reduce a speed of the robot from a first speed used to move the robot forward to a second speed lower than the first speed and control the weight drive mechanism to tilt the weight to the first side as viewed in a direction in which the display portion is facing so as to turn the robot with a second turning radius that is larger than a first turning radius. The first turning radius may be a turning radius of the robot in the process to determine whether there is a down-step until the robot turns 360 degrees from the first turning angle in increments of the predetermined unit turning angle.

According to the present aspect, if no down-step is present in a 360 degree direction around the robot and no person is present around the robot, it is determined whether an obstacle is present in front of the robot. According to the present aspect, if it is determined that an obstacle is present ahead of the robot, the speed of the robot is reduced from the first speed at which the robot travels forward to the second speed lower than the first speed and, thereafter, the weight is tilted to the first side. In this manner, the robot can pass around the obstacle while turning with a second turning radius larger than the first turning radius with which the robot makes a pivot turn. In addition, since the robot passes around the obstacle at the second speed lower than the first speed, the robot can be prevented from turning with an excessively large turning radius.

(11) According to the above aspect, the robot may further include a camera that captures an image of surroundings of the robot and a microphone that acquires a sound signal from the surroundings of the robot. If the control circuit determines that there is no down-step in a 360 degree direction and that an image of the person is included in the acquired image or voice of the person is included in the acquired sound signal, the control circuit may control the second drive mechanism to move the robot forward in a direction in which the person is located at the first speed used to move the robot forward.

According to the present aspect, when no down-step is present and if a person is present in the 360 degree direction around the robot, the robot can be caused to travel towards the person. Thus, the robot can behave as if it were friendly to the person, for example.

(12) According to the above aspect, the control circuit may determine whether voice of the person corresponding to an instruction to the robot is included in the sound signal acquired by the microphone within a predetermined period of time after rotating the main casing and moving the main casing forward by a distance that is smaller than the first distance. If the control circuit determines that a voice instruction to the robot is included in the sound signal acquired by the microphone, the control circuit may execute a task corresponding to the instruction.

According to the present aspect, when a person utters a voice instruction to the robot within a predetermined period of time after moving the robot towards a person, the robot executes a task corresponding to the instruction. As a result, according to the present aspect, a situation in which although the person instructs the robot to execute a task, the robot ignores the instruction and continues to travel can be prevented.

(13) According to the above aspect, the control circuit may control the second drive mechanism to stop the forward movement and the backward movement of the robot in accordance with a stop control amount for stopping the rotation of the main casing, control the weight drive mechanism to tilt the weight to the first side in accordance with a first rotation control amount, control the second drive mechanism to move the robot forward in accordance with a first acceleration control amount for rotating the main casing with the weight tilted to the first side, control the second drive mechanism to stop the forward movement and the backward movement of the robot, control the weight drive mechanism to tilt the weight to the second side as viewed in the direction in which the display portion is facing in accordance with a second rotation control amount that is a control amount in a direction opposite to the direction of the first rotation control amount, and control the second drive mechanism to move the robot backward with the weight tilted to the second side in accordance with a second control amount having the same control amount as the first acceleration control amount.

The present aspect is an example of a pivot turn process.

(14) According to the above aspect, the control circuit may control the second drive mechanism to move the robot forward in accordance with a deceleration control amount for moving the robot forward at the second speed and control the weight drive mechanism to tilt the weight to the first side in accordance with a first rotation control amount. The first rotation control amount may be a rotation control amount used to control the weight drive mechanism to tilt the weight to the first side with forward movement and backward movement of the robot stopped by controlling the second drive mechanism in accordance with a stop control amount used to stop rotation of the main casing.

The present aspect is an example of control performed to move a robot and turn the robot to the first side.

EMBODIMENTS

Embodiments of the present disclosure are described below with reference to the accompanying drawings. Note that the same reference numerals are used throughout the drawings to designate the same or similar constituent elements.

Overall Configuration

Figure 1B:
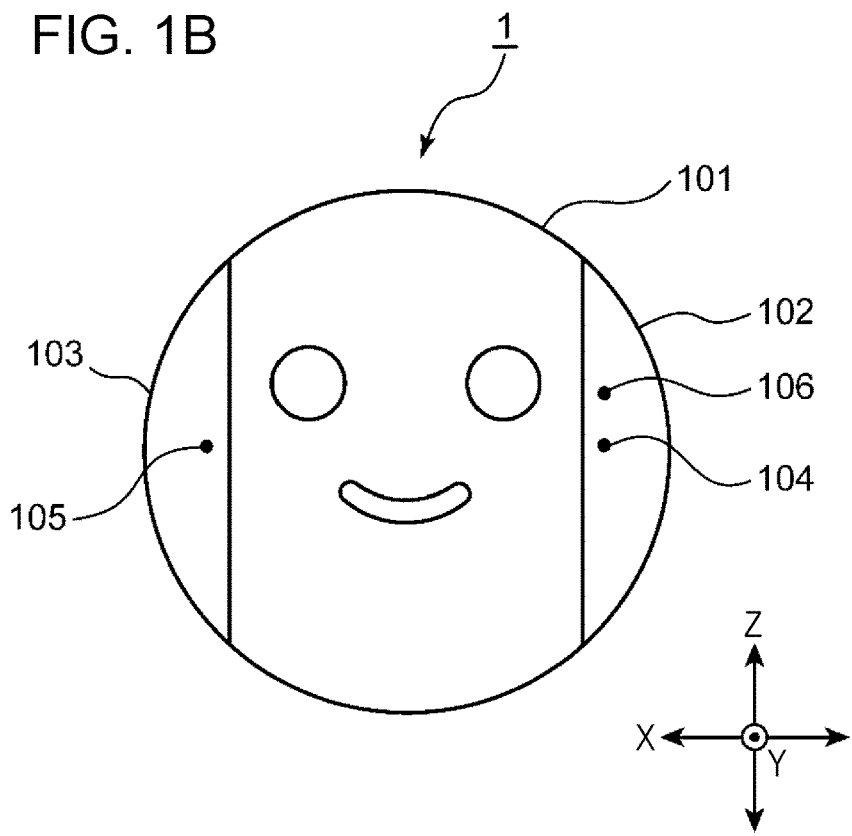
FIG. 1B is an external front view of the robot according to the embodiment of the present disclosure.

FIG. 1A is an external perspective view of a robot 1 according to an embodiment of the present disclosure. FIG. 1B is an external front view of the robot 1 according to the embodiment of the present disclosure. As illustrated in FIGS. 1A and 1B, the robot 1 includes a spherical band-shaped main casing 101, a first spherical cap portion 102, and a second spherical cap portion 103. The main casing 101, the first spherical cap portion 102, and the second spherical cap portion 103 together constitute a spherical body. That is, the robot 1 has a spherical shape. In addition, as illustrated in FIG. 1A, the robot 1 includes a camera 104 in the first spherical cap portion 102 and a range finding sensor 105 in the second spherical cap portion 103. The camera 104 is mounted in the first spherical cap portion 102 such that the optical axis is oriented, for example, in the frontward direction of the robot 1. The camera 104 captures the image of the surroundings of the robot 1. The range finding sensor 105 is attached to the second spherical cap portion 103 such that the optical axis is oriented, for example, in the frontward direction of the robot 1. The range finding sensor 105 detects the distance information from the range finding sensor 105 to an object located in front of the robot 1.

In addition, as illustrated in FIG. 1A, the robot 1 includes a microphone 106 and a loudspeaker 107 in the first spherical cap portion 102. The microphone 106 acquires a sound signal from the surroundings of the robot 1. The loudspeaker 107 outputs the voice information of the robot 1. Note that according to the present embodiment, the robot 1 includes the camera 104 in the first spherical cap portion 102 and includes the range finding sensor 105 in the second spherical cap portion 103. However, the configuration of the robot 1 is not limited thereto. The camera 104 and the range finding sensor 105 can be included in at least one of the first spherical cap portion 102 and the second spherical cap portion 103. While the present embodiment is described with reference to the robot 1 including the microphone 106 and the loudspeaker 107 in the first spherical cap portion 102, the configuration of the robot 1 is not limited thereto. At least one of the first spherical cap portion 102 and the second spherical cap portion 103 can include the microphone 106 and the loudspeaker 107.

Figure 2:
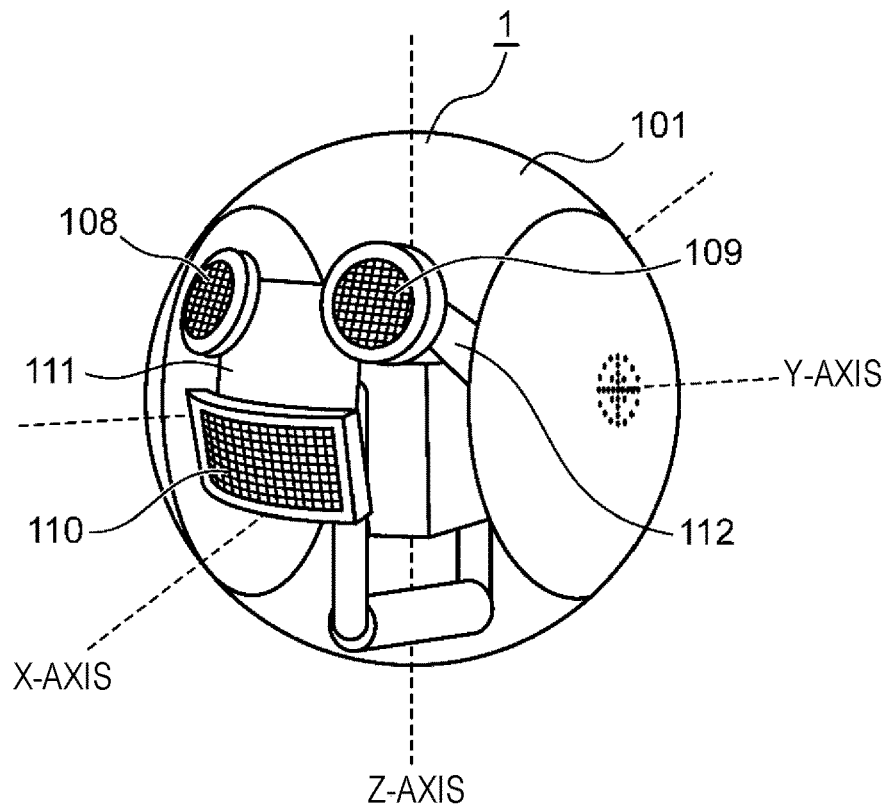
FIG. 2 is an internal perspective view of the robot according to the embodiment of the present disclosure.
Figure 3:
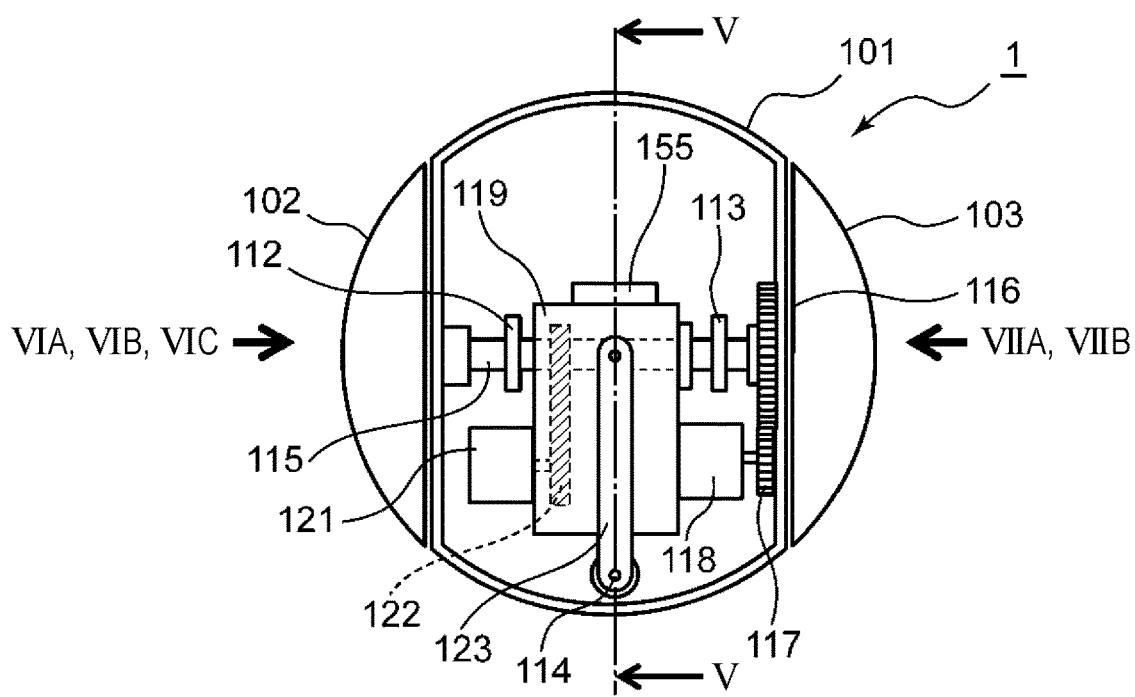
FIG. 3 is an internal rear view of the robot according to the embodiment of the present disclosure.

FIG. 2 is an internal perspective view of the robot 1 according to the embodiment of the present disclosure. As illustrated in FIG. 2, the robot 1 includes a first display portion 108, a second display portion 109, and a third display portion 110 inside a main casing 101. The first display portion 108, the second display portion 109, and the third display portion 110 are provided on a fixed sheet metal plate 111. The fixed sheet metal plate 111 is attached to a shaft 115 (refer to FIG. 3) via a first arm 112 and a second arm 113. FIG. 3 is an internal rear view of the robot 1 according to the embodiment of the present disclosure. As illustrated in FIG. 3, the first arm 112 and the second arm 113 are attached to the shaft 115 so as to extend from the shaft 115 to the front of the robot 1 in a direction perpendicular to the shaft 115. For example, the first display portion 108, the second display portion 109, and the third display portion 110 are formed from a plurality of light emitting diodes. The first display portion 108, the second display portion 109, and the third display portion 110 display information regarding the facial feedback from the robot 1. More specifically, as illustrated in FIGS. 1A and 1B, the first display portion 108, the second display portion 109, and the third display portion 110 display parts of the face of the robot 1 (for example, the eyes and the mouth) by individually controlling the lighting of the plurality of light emitting diodes. In the example illustrated in FIG. 2, the first display portion 108 displays the image of the left eye when the robot 1 is viewed from the front, the second display portion 109 displays the image of the right eye when the robot 1 is viewed from the front, and the third display portion 110 displays an image of the mouth. The optical images of the left eye, the right eye, and the mouth are transmitted through the main casing 101 made of a transparent or translucent member and are emitted to the outside.

Note that the first arm 112 and the second arm 113 are attached to the shaft 115 so as to extend to the front surface of the robot 1. Accordingly, the direction in which the first display portion 108 and the second display portion 109 are oriented, that is, the direction in which the display portion is facing corresponds to the frontward direction.

As illustrated in FIG. 3, the robot 1 includes a weight 114 in the lower section of the interior of the main casing 101. Therefore, the center of gravity of the robot 1 is positioned below the center of the main casing 101. Thus, the operation performed by the robot 1 can be stabilized. FIG. 3 also illustrates a first drive mechanism 203 (refer to FIG. 11) for rotating the shaft 115, a second drive mechanism 204 (refer to FIG. 11) for rotating the main casing 101, and a weight drive mechanism 205 (refer to FIG. 11) for moving the center of gravity of the robot 1.

Figure 4:
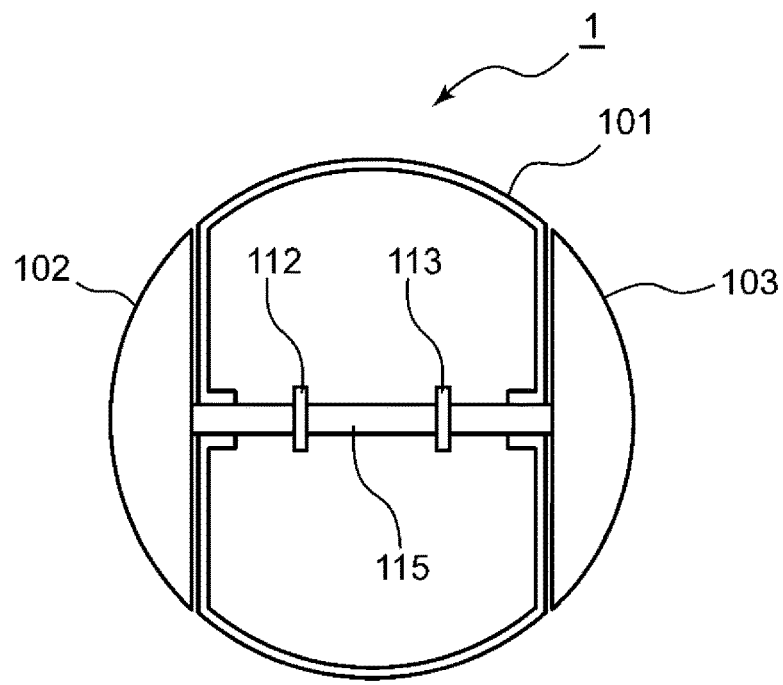
FIG. 4 is an internal rear view illustrating a first spherical cap portion and a second spherical cap portion of the robot joined to each other according to the embodiment of the present disclosure.

In FIG. 3, the shaft 115 is located at the center of the robot 1 and serves as the central axis of the robot 1. FIG. 4 is an internal rear view illustrating the first spherical cap portion 102 and the second spherical cap portion 103 of the robot 1 joined to each other according to the embodiment of the present disclosure. In FIG. 4, the first spherical cap portion 102 and the second spherical cap portion 103 are joined to each other by the shaft 115. Note that the shaft 115 is not fixed to the main casing 101. Accordingly, when the shaft 115 is rotated, the first spherical cap portion 102 and the second spherical cap portion 103 connected to the shaft 115 rotate in synchronization with the shaft 115. However, at this time, the main casing 101 does not rotate.

As illustrated in FIG. 3, the second drive mechanism 204 (refer to FIG. 11) includes a first gear 116 fixed to the main casing 101, a second gear 117 meshing with the first gear 116, a first motor 118 connected to the second gear 117, and a frame 119 for fixing the first motor 118. The frame 119 is suspended from the shaft 115. Consequently, even when the shaft 115 rotates, the frame 119 does not rotate. In addition, the frame 119 includes a gyro sensor 155 that detects the rotation amount of the frame 119. According to the present embodiment, the center of the first gear 116 coincides with the center of the shaft 115. The operation performed by the second drive mechanism 204 (refer to FIG. 11) is described in detail below.

Figure 5:
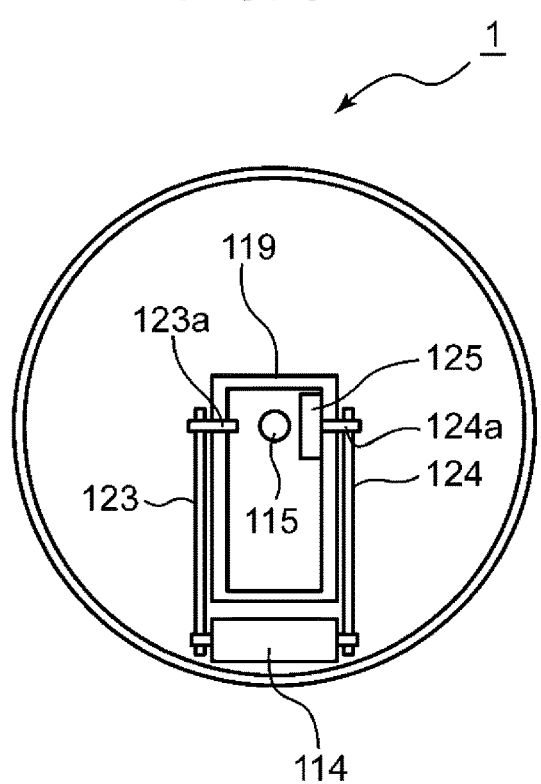
FIG. 5 is a cross-sectional view of the robot taken along line V-V in FIG. 3.

The weight drive mechanism 205 (refer to FIG. 11) is described below with reference to FIGS. 3 and 5. FIG. 5 is a cross-sectional view of the robot 1 taken along line V-V in FIG. 3. The V-V cross section is a plane orthogonal to the direction VIA, VIB, VIC (or the direction VIIA, VIIB) and is a cross section obtained when the robot 1 is cut with a plane which passes through the center of the robot 1.

As illustrated in FIGS. 3 and 5, the weight drive mechanism 205 (refer to FIG. 11) includes a third arm 123 that supports one end of the weight 114, a fourth arm 124 that supports the other end of the weight 114, and a third motor 125 connected to the fourth arm 124. According to the present embodiment, the weight drive mechanism 205 (refer to FIG. 11) is attached for free rotation to the frame 119.

Thus, even when the third motor 125 is driven, the frame 119 does not rotate together with the third motor 125 being driven.

More specifically, the third arm 123 has a weight shaft 123a attached to its upper end. The third arm 123 is attached for free rotation to the frame 119 via the weight shaft 123a. The fourth arm 124 has a weight shaft 124a attached to its upper end. The fourth arm 124 is attached for free rotation to the frame 119 via the weight shaft 124a.

The weight shaft 123a and the weight shaft 124a are attached to the frame 119 in a straight line so as to be orthogonal to the vertical plane passing through the shaft 115.

More specifically, one end of the weight shaft 123a adjacent to the shaft 115 is inserted for free rotation into a hole formed in the frame 119. One end of the weight shaft 124a adjacent to the shaft 115 is inserted for free rotation into a hole formed in the frame 119 and is connected to the third motor 125. The weight 114 is cylindrical, for example, and is sandwiched between the lower end of the third arm 123 and the lower end of the fourth arm 124 such that the length direction thereof is parallel to the weight shaft 123a and the weight shaft 124a. In this manner, the weight 114 is attached to the frame 119 so as to be rotatable around the weight shafts 123a and 124a, that is, around the roll axis. The operation performed by the weight drive mechanism 205 (refer to FIG. 11) is described in detail below.

Figure 6A:
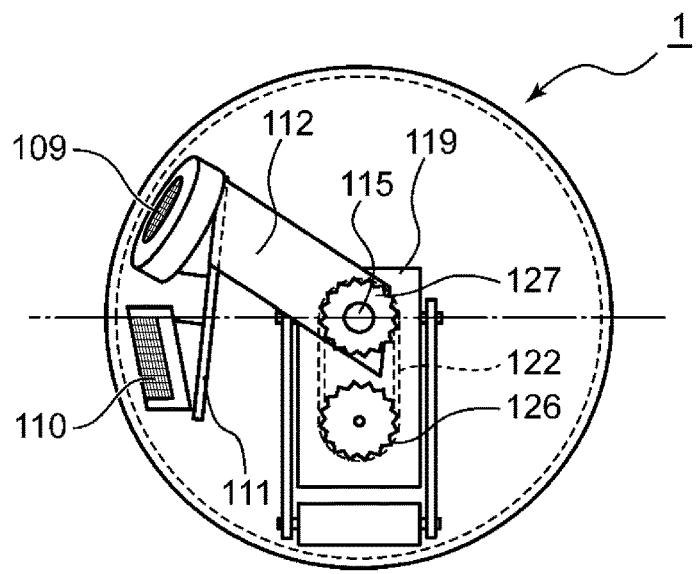
FIG. 6A is an internal side view of the robot as viewed in direction VIA, VIB, VIC in FIG. 3.

The first drive mechanism 203 (refer to FIG. 11) is described below with reference to FIGS. 3 and 6A. FIG. 6A is an internal side view of the robot 1 as viewed from direction VIA, VIB, VIC in FIG. 3. The view from VIA, VIB, VIC is the view of the robot 1 from the left, where the term "left" refers to the left of an observer viewing the robot 1 from the back to the front of the robot 1. In addition, the view from VIIA, VIIB is the view of the robot 1 from the right, where the term "right" is the right of an observer viewing the robot 1 from the back to the front of the robot 1. As illustrated in FIGS. 3 and 6A, the first drive mechanism 203 (refer to FIG. 11) includes a drive belt 122 that synchronizes a second motor 121 fixed to the frame 119, a third gear 126 connected to the second motor 121, and a fourth gear 127 fixed to the third gear 126 and the shaft 115 with one another. The operation performed by the first drive mechanism 203 (refer to FIG. 11) is described in detail below.

Figure 11:
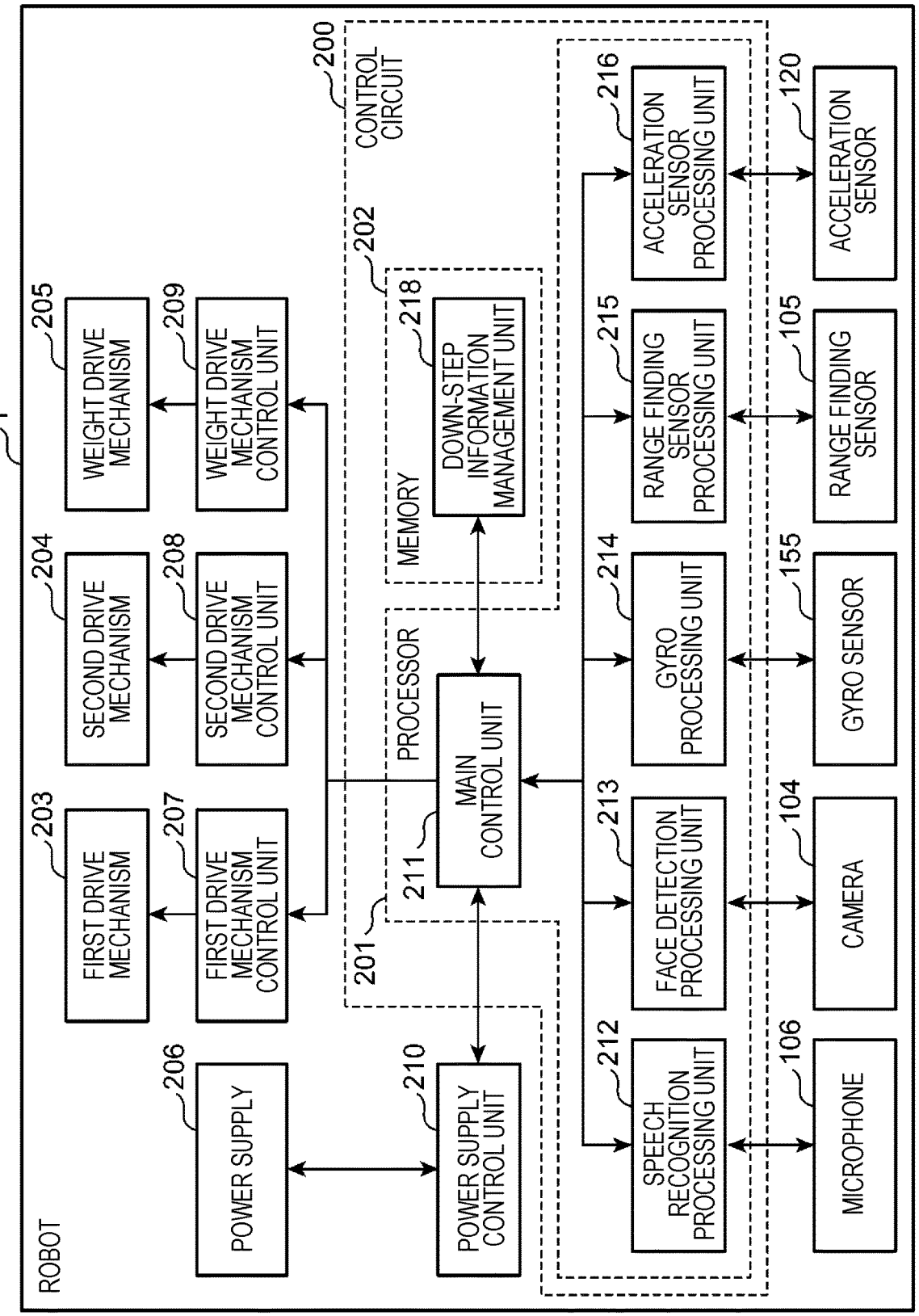
FIG. 11 is a block diagram of the robot according to the embodiment of the present disclosure.

Although not illustrated in FIG. 3, the robot 1 includes a control circuit 200 (refer to FIG. 11). The control circuit 200 controls a variety of operations performed by the robot 1. The control circuit 200 (refer to FIG. 11) is described in detail below.

The operation performed by the first drive mechanism 203 (refer to FIG. 11) is described in detail below with reference to FIGS. 6A, 6B, and 6C.

Figure 6B:
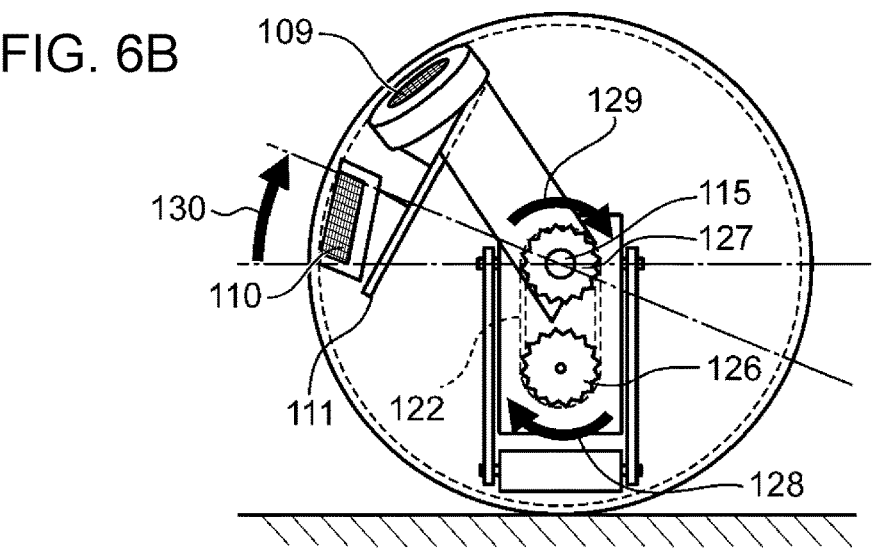
FIG. 6B is an internal side view of the robot having a first display portion, a second display portion, and a third display portion which are tilted upward as viewed in direction VIA, VIB, VIC in FIG. 3, according to the embodiment of the present disclosure.

FIG. 6B is an internal side view of the robot 1 having the first display portion 108, the second display portion 109, and the third display portion 110 which are tilted upward as viewed in direction VIA, VIB, VIC in FIG. 3, according to the embodiment of the present disclosure. FIG. 6C is an internal side view of the robot 1 having the first display portion 108, the second display portion 109, and the third display portion 110 which are tilted downward as viewed in direction VIA, VIB, VIC in FIG. 3, according to the embodiment of the present disclosure.

As illustrated in FIG. 6A, the first display portion 108, the second display portion 109, and the third display portion 110 located at default positions face in the frontward direction of the robot 1. When the second motor 121 (refer to FIG. 3) is driven, the third gear 126 connected to the second motor 121 rotates. The drive power of the second motor 121 is transmitted to the fourth gear 127 via the drive belt 122, and the shaft 115 having the fourth gear 127 fixed thereto is rotated in synchronization with the driving of the second motor 121. As illustrated in FIG. 2, the fixed sheet metal plate 111 is joined to the shaft 115 via the first arm 112 and the second arm 113. In addition, the first spherical cap portion 102 and the second spherical cap portion 103 are joined to each other by a shaft 115 (refer to FIG. 4). Thus, due to the rotation of the shaft 115, that is, the rotation of the first spherical cap portion 102 and the second spherical cap portion 103, the first display portion 108, the second display portion 109, and the third display portion 110 provided on the fixed sheet metal plate 111 also rotate together with the shaft 115.

As illustrated in FIG. 6B, when the shaft 115 is rotated in a direction indicated by an arrow 128 and an arrow 129 from the above-described default position, the first display portion 108, the second display portion 109 (refer to FIG. 2) and the third display portion 110 are tilted upward, as indicated by an arrow 130. Note that the direction indicated by the arrows 128 and 129 is the clockwise direction about the shaft 115 as viewed in direction VIA, VIB, VIC (refer to FIG. 3). The upward direction indicated by the arrow 130 is the clockwise direction around the shaft 115 as viewed in direction VIA, VIB, VIC (refer to FIG. 3).

Although not illustrated in FIG. 6B, the first spherical cap portion 102 (refer to FIG. 1B) and the second spherical cap portion 103 (refer to FIG. 1B) that rotate in synchronization with the shaft 115 are also tilted upward as indicated by the arrow 130. That is, the optical axis of the camera 104 and the optical axis of the range finding sensor 105 mounted in the first spherical cap portion 102 (refer to FIG. 1B) and the second spherical cap portion 103 (refer to FIG. 1B), respectively, are also tilted upward as indicated by the arrow 130.

Figure 6C:
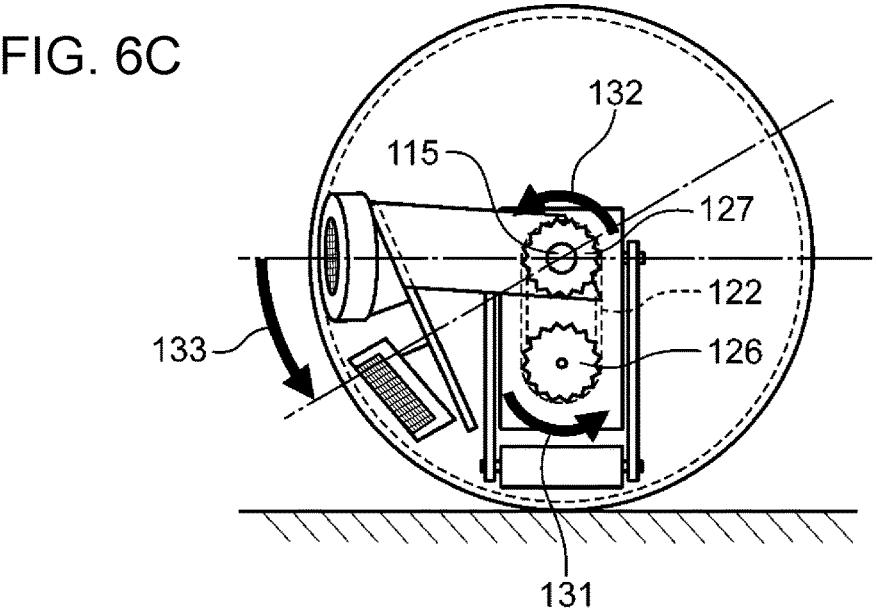
FIG. 6C is an internal side view of the robot having the first display portion, the second display portion, and the third display portion which are tilted downward as viewed in direction VIA, VIB, VIC in FIG. 3, according to the embodiment of the present disclosure.

In addition, as illustrated in FIG. 6C, if the third gear 126 is rotated from the above-described default position counterclockwise as indicated by the arrow 131 and, thus, the fourth gear 127 and the shaft 115 are rotated counterclockwise indicated by the arrow 132, the first display portion 108, the second display portion 109 (refer to FIG. 2), and the third display portion 110 are tilted downward as indicated by an arrow 133. Note that the downward direction indicated by the arrow 133 is a counterclockwise direction about the shaft 115 as viewed in direction VIA, VIB, VIC (refer to FIG. 3). Although not illustrated in FIG. 6C, the first spherical cap portion 102 (refer to FIG. 1B) and the second spherical cap portion 103 (refer to FIG. 1B) which rotate in synchronization with the shaft 115 are also tilted downward as indicated by the arrow 133. That is, the optical axis of the camera 104 and the optical axis of the range finding sensor 105 mounted in the first spherical cap portion 102 (refer to FIG. 1B) and the second spherical cap portion 103 (refer to FIG. 1B), respectively, are also tilted downward, as indicated by the arrow 133.

The operation performed by the second drive mechanism 204 (refer to FIG. 11) is described in detail below with reference to FIGS. 7A and 7B.

Figure 7A:
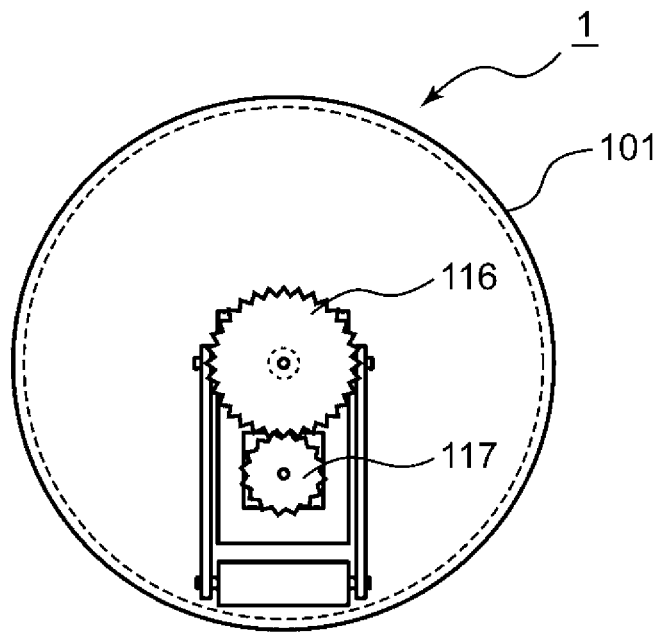
FIG. 7A is a side view of a second drive mechanism of the robot as viewed in direction VIIA, VIIB in FIG. 3, according to the embodiment of the present disclosure.

FIG. 7A is a side view of the second drive mechanism 204 (refer to FIG. 11) of the robot 1 as viewed in direction VIIA, VIIB in FIG. 3 according to the embodiment of the present disclosure. FIG. 7B is a side view illustrating the rectilinear motion of the robot 1 as viewed in direction VIIA, VIIB in FIG. 3.

In FIG. 7A, if the first motor 118 (refer to FIG. 3) is driven, the second gear 117 connected to the first motor 118 rotates. The drive power is transferred to the first gear 116 meshing with the second gear 117. As a result, the main casing 101 having the first gear 116 fixed thereto rotates in synchronization with the driving of the first motor 118.

Figure 7B:
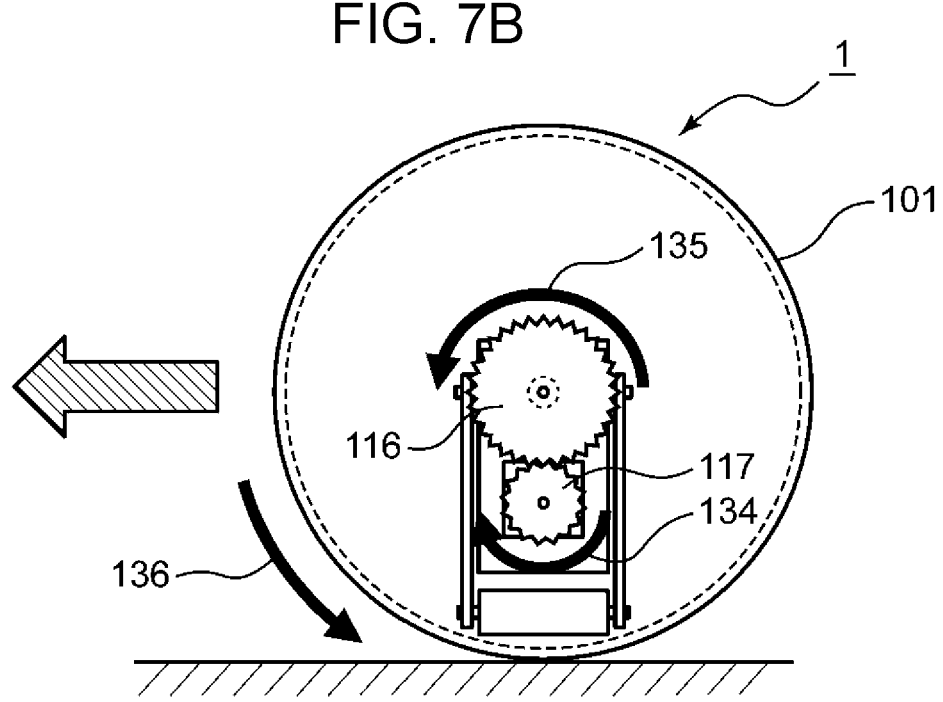
FIG. 7B is a side view illustrating the rectilinear motion of the robot as viewed in direction VIIA, VIIB in FIG. 3.

In FIG. 7B, if the first motor 118 (refer to FIG. 3) is rotated in the direction of an arrow 134, the first gear 116 meshing with the second gear 117 rotates in the direction of an arrow 135. Note that the direction of the arrow 134 is the clockwise direction about the second gear 117 as viewed in direction VIIA, VIIB (refer to FIG. 3). In addition, the direction of the arrow 135 is the counterclockwise direction about the shaft 115 as viewed in direction VIIA, VIIB (refer to FIG. 3). At this time, the main casing 101 having the first gear 116 fixed thereto rotates in the direction of an arrow 136. Note that the direction of the arrow 136 is the counterclockwise direction about the shaft 115 as viewed in direction VIIA, VIIB (refer to FIG. 3). As a result, the robot 1 moves forward. In contrast, if the first motor 118 is rotated in a direction opposite to the arrow 134, the main casing 101 rotates in a direction opposite to the direction of the arrow 136, so that the robot 1 moves backward. In this manner, the robot 1 can move in either the forward or backward direction by switching the rotation direction of the first motor 118 in the second drive mechanism 204 (refer to FIG. 11).

The operation performed by the weight drive mechanism 205 (refer to FIG. 11) is described in detail below with reference to FIGS. 8A and 8B.

Figure 8A:
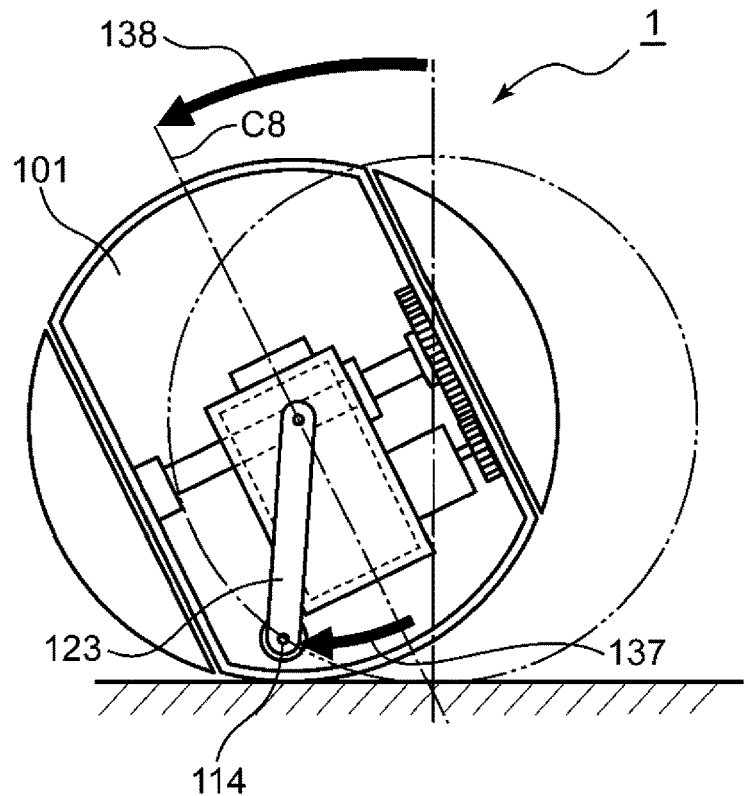
FIG. 8A is an internal rear view illustrating the posture of the robot when a weight of the robot is positioned on the left side in FIG. 3.

FIG. 8A is an internal rear view illustrating the posture of the robot 1 when the weight 114 of the robot 1 is positioned on the left side in FIG. 3. FIG. 8B is an internal rear view illustrating the posture of the robot 1 when the weight 114 of the robot 1 is positioned on the right side in FIG. 3.

As illustrated in FIG. 8A, if the weight 114 is moved from a medial line C8 to the left as indicated by an arrow 137 by driving the third motor 125 (FIG. 5), the posture of the robot 1 is tilted in a direction indicated by an arrow 138. Note that the medial line C8 is a line passing through the upper vertex and the lower vertex of the main casing 101. The "left direction" indicated by the arrow 137 refers to the clockwise direction when the robot 1 is viewed from the back to the front. In addition, the direction indicated by the arrow 138 refers to the counterclockwise direction about the contact point between the ground and the robot 1.

Figure 8B:
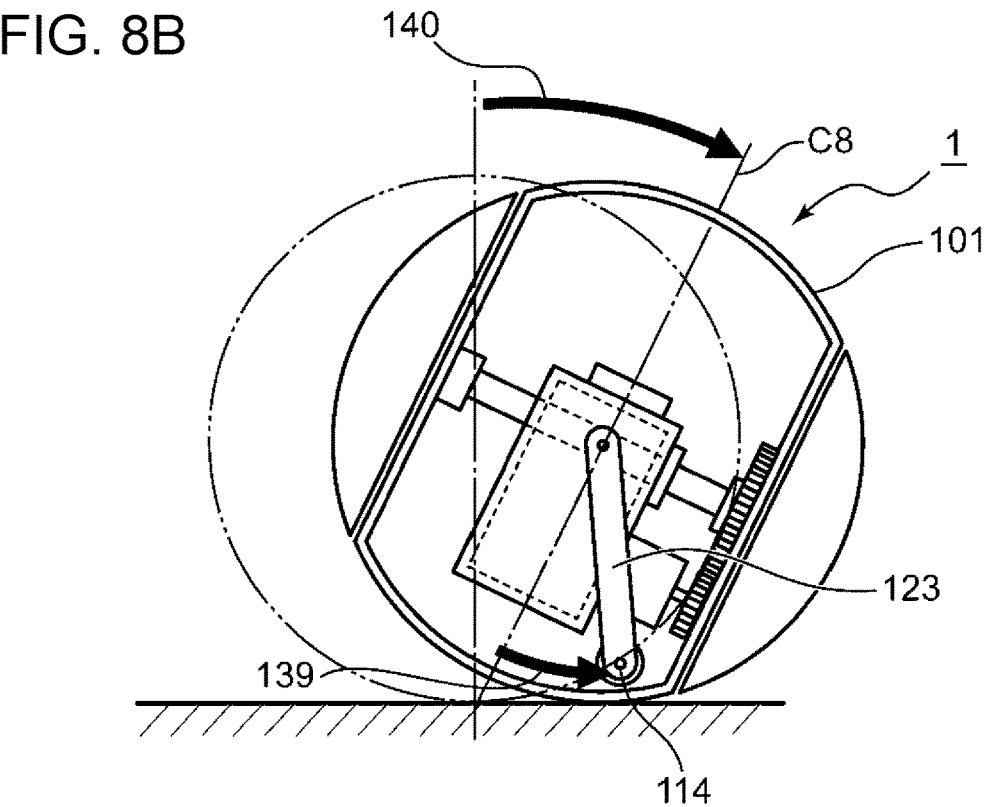
FIG. 8B is an internal rear view illustrating the posture of the robot when the weight of the robot is positioned on the right side in FIG. 3.

As illustrated in FIG. 8B, if the weight 114 is moved from the medial line C8 to the right as indicated by an arrow 139 by driving the third motor 125 (refer to FIG. 5) in the opposite direction, the posture of the robot 1 is tilted in the direction indicated by an arrow 140. Here, the "right" indicated by the arrow 139 refers to a counterclockwise direction when the robot 1 is viewed from the back to the front. The direction indicated by the arrow 140 refers to the clockwise direction about the contact point between the ground and the robot 1. Note that when, as illustrated in FIG. 3, the weight 114 is tilted to neither the right nor the left and, thus, third arm 123 and the fourth arm 124 are oriented in the vertical direction, the position of the weight 114 is referred to as an "initial position".

A state in which the operation performed by the second drive mechanism 204 (refer to FIG. 11) and the operation performed by the weight drive mechanism 205 (refer to FIG. 11) are simultaneously driven is described with reference to FIGS. 8A and 8B.

As illustrated in FIG. 8A, if the first motor 118 drives the robot 1 such that the robot 1 moves in the travel direction with the posture of the robot 1 tilted in the direction indicated by the arrow 138, the robot 1 turns to the left as seen in top view. In contrast, as illustrated in FIG. 8B, if the first motor 118 drives the robot 1 such that the robot 1 moves in the travel direction with the posture of the robot 1 tilted in the direction indicated by the arrow 140, the robot 1 turns to the right as seen in top view.

As described above, the travel direction of the robot 1 can be switched to the left or right by combining shifting of the weight 114 to the left or right by using the weight drive mechanism 205 (refer to FIG. 11) with forward or backward motion of the main casing 101 by using the second drive mechanism 204 (refer to FIG. 11). Thus, the robot 1 can turn to the right or left while moving.

The posture of the robot 1 at the start of traveling is described below with reference to FIG. 9.

Figure 9:
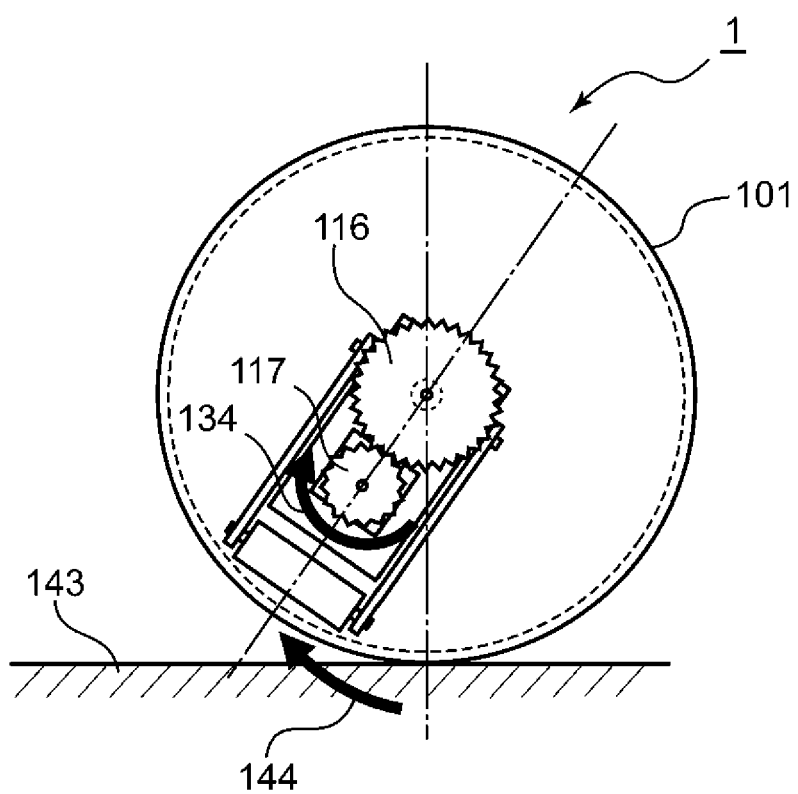
FIG. 9 illustrates the posture of the robot until a main casing starts rotating in the direction of an arrow 136 illustrated in FIG. 7B.

FIG. 9 illustrates the posture of the robot 1 until the main casing 101 starts rotating in the direction of the arrow 136 illustrated in FIG. 7B. If the drive force generated by the second drive mechanism 204 (refer to FIG. 11) is larger than the force caused by an external factor, such as friction of the floor surface 143, the main casing 101 moves in the direction indicated by the arrow 136 (refer to FIG. 7B). However, if the drive force generated by the second drive mechanism 204 (refer to FIG. 11) is smaller than the force caused by an external factor, such as friction of the floor surface 143, the main casing 101 does not start rotating. At this time, when the main casing 101 does not rotate, the first gear 116 does not rotate either, since the first gear 116 is fixed to the main casing 101. In FIG. 9, in the case where the main casing 101 does not rotate, if the first motor 118 is rotated in the direction of the arrow 134, the second gear 117 moves along the teeth of the meshed first gear 116. Since the second gear 117 and the first motor 118 are fixed to the frame 119 (refer to FIG. 3), the second gear 117 and the first motor 118 rotate in the direction of an arrow 144 together with the frame 119 (refer to FIG. 3) and the weight drive mechanism 205 (refer to FIG. 11) and the gyro sensor 155 (refer to FIG. 3) fixed to the frame 119 (refer to FIG. 11). Note that the direction of the arrow 144 is the clockwise direction about the shaft 115 as viewed in direction VIIA, VIIB (refer to FIG. 3).

As a result, the pitch angle of the main casing 101 increases due to the influence of a force based on external factors until the robot 1 starts traveling. In addition, the gyro sensor 155 is attached to the frame 119, and the pitch angle of the frame 119 also increases as the pitch angle of the main casing 101 increases. Thus, the gyro sensor 155 can detect the angle of the main casing 101 in the pitch direction.

Figure 10:
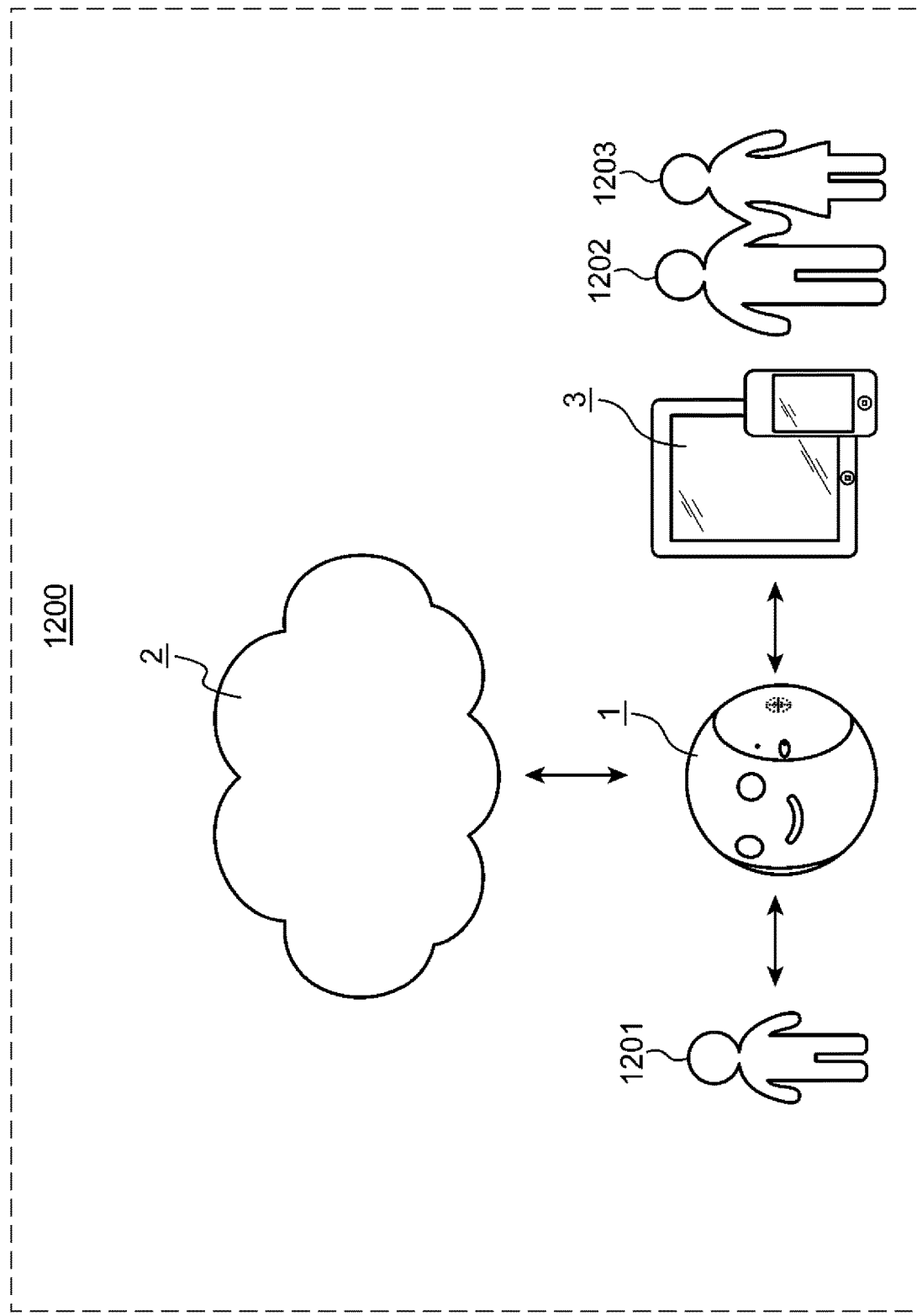
FIG. 10 illustrates an example of the overall configuration of a robot system including the robot according to an embodiment of the present disclosure.

An example of the overall configuration of a robot system 1200 including the robot 1 according to the embodiment of the present disclosure is described below with reference to FIG. 10. FIG. 10 illustrates an example of the overall configuration of the robot system 1200 including the robot 1 according to an embodiment of the present disclosure. The robot system 1200 includes a cloud server 2, a mobile terminal 3, and the robot 1. The robot 1 is connected to the Internet via, for example, Wifi (registered trademark) communication and is connected to the cloud server 2. In addition, the robot 1 is connected to the mobile terminal 3 via, for example, Wifi (registered trademark) communication. A user 1201 is, for example, a child, and users 1202 and 1203 are, for example, the parents of the child.

For example, if the robot 1 receives, via the mobile terminal 3, an instruction to read a certain picture book aloud to a child, the robot 1 starts reading the picture book to the child. For example, upon receiving a question from the child while reading the picture book, the robot 1 sends the question to the cloud server 2, receives an answer to the question from the cloud server 2, and utters speech corresponding to the answer.

In this way, the users 1201 to 1203 can treat the robot 1 like a pet and learn a language through interaction with the robot 1.

Block Diagram

An internal circuit of the robot 1 according to the embodiment of the present disclosure is described in detail below with reference to FIG. 11. FIG. 11 is a block diagram of the robot 1 according to the embodiment of the present disclosure.

As illustrated in FIG. 11, the robot 1 includes the control circuit 200, the first drive mechanism 203, a first drive mechanism control unit 207, the second drive mechanism 204, a second drive mechanism control unit 208, the weight drive mechanism 205, a weight drive mechanism control unit 209, a power supply 206, a power supply control unit 210, the microphone 106, the camera 104, the gyro sensor 155, the range finding sensor 105, and an acceleration sensor 120.

The control circuit 200 includes a processor 201 and a memory 202. The processor 201 is formed from, for example, at least one of a central processing unit (CPU), a field programmable gate array (FPGA), and an application specific integrated circuit (ASIC) and includes a main control unit 211, a speech recognition processing unit 212, a face detection processing unit 213, a gyro processing unit 214, a range finding sensor processing unit 215, and an acceleration sensor processing unit 216. The memory 202 is composed of, for example, a rewritable nonvolatile memory and includes a down-step information management unit 218.

The main control unit 211 acquires, from the speech recognition processing unit 212, the result of recognition of the speech of a person. The main control unit 211 acquires, from the face detection processing unit 213, the result of recognition of the face of a person. The main control unit 211 acquires, from the gyro processing unit 214, the measurement value that is measured by the gyro sensor 155 and that indicates the posture of the robot 1. The main control unit 211 acquires, from the range finding sensor processing unit 215, the measurement value that is measured by the range finding sensor 105 and that indicates the distance from the range finding sensor 105 to an object located in front of the robot 1. The main control unit 211 acquires, from the acceleration sensor processing unit 216, the measurement value that is measured by the acceleration sensor 120 and that indicates the acceleration of the robot 1. The main control unit 211 acquires, from the power supply control unit 210, a charging flag indicating whether the power supply 206 is in a charged state and the remaining capacity of the power supply 206.

The main control unit 211 generates a control command of the robot 1 on the basis of the information acquired from the speech recognition processing unit 212, the face detection processing unit 213, the gyro processing unit 214, the range finding sensor processing unit 215, the acceleration sensor processing unit 216, and the power supply control unit 210 and outputs the generated control command to the first drive mechanism control unit 207, the second drive mechanism control unit 208, and the weight drive mechanism control unit 209. The control command is described in more detail below.

The speech recognition processing unit 212 determines the presence or absence of the speech of a person from the audio data acquired by the microphone 106 and manages the speech recognition result. The speech recognition processing unit 212 includes a voice identification table in which the features of the voices of one or more predetermined persons who use the robot 1 are associated with the identifiers of the persons. Thereafter, the speech recognition processing unit 212 calculates the degree of coincidence between the feature of the voice extracted from the audio data acquired by the microphone 106 and the feature of the voice of each of the persons stored in the voice identification table. Subsequently, the speech recognition processing unit 212 identifies, from among the persons listed in the voice identification table, a person having the degree of coincidence of the feature that is higher than a predetermined threshold and that is the highest as the person who uttered the speech included in the audio data acquired by the microphone 106. Thereafter, the speech recognition processing unit 212 outputs, to the main control unit 211, data in which the identifier of the identified person is associated with, for example, the recognition time as the recognition result of the speech of the person. Note that, for example, voice print data can be employed as the feature of the speech.

The face detection processing unit 213 recognizes a person located in front of the robot 1 on the basis of the image data acquired by the camera 104. The face detection processing unit 213 includes a face identification table in which the feature of the face of each of one or more predetermined persons who use the robot 1 is associated with the identifier of the person. Thereafter, the face detection processing unit 213 calculates the degree of coincidence between the feature of each of one or more faces extracted from the image data acquired by the camera 104 and the feature of the face of each of the persons listed in the face identification table. Subsequently, for each of the persons included in the image data, the face detection processing unit 213 recognizes, from among the persons listed in the face identification table, the person having the degree of coincidence of the feature that is higher than a predetermined threshold and that is the highest as the corresponding person. Note that for example, the relative positions of the eyes, nose, and mouth in the face and the outline of the face can be employed as the feature of a face. Subsequently, the face detection processing unit 213 outputs, to the main control unit 211, the image data obtained by tagging the identifier of the person at the position of the face of each of the persons included in the image data as the recognition result of the face of the person.

The gyro processing unit 214 sequentially acquires measurement values measured by the gyro sensor 155 at predetermined sampling intervals and sequentially outputs the measurement values to the main control unit 211.

The gyro sensor 155 is a gyro sensor that measures the angles of three components, that is, a roll angle, a pitch angle, and a yaw angle. As illustrated in FIG. 2, the term "roll angle" refers to a rotation angle about the X-axis, the term "pitch angle" refers to a rotation angle about the Y-axis, and the term "yaw angle" refers to a rotation angle about the Z-axis. The X-axis is the roll axis and is an axis extending in the frontward direction of the robot 1. The Y-axis is the pitch axis and is an axis extending in the right-left direction of the robot 1. The Z-axis is the yaw axis and is an axis extending in the vertical direction of the robot 1. The X-axis, the Y-axis, and the Z-axis are orthogonal to one another.

The range finding sensor processing unit 215 sequentially acquires measurement values measured by the range finding sensor 105 at predetermined sampling periods and sequentially outputs the measurement values to the main control unit 211.

The range finding sensor 105 is an infrared range sensor that measures the distance from the sensor to the object, for example, by emitting infrared light onto an object in front and measuring the time it takes the reflected light to return to the sensor. Note that the range finding sensor 105 may be configured as a distance image sensor for measuring the distance distribution of the surroundings in front of the robot 1 or may be configured by a stereo camera, for example.

The acceleration sensor processing unit 216 sequentially acquires measurement values measured by the acceleration sensor 120 at predetermined sampling intervals and sequentially outputs the measurement values to the main control unit 211.

The acceleration sensor 120 is, for example, a three-axis acceleration sensor that measures three acceleration components along the X-axis, the Y-axis, and the Z-axis illustrated in FIG. 2.

For example, the first drive mechanism control unit 207 includes a control circuit that controls the second motor 121 constituting the first drive mechanism 203. The first drive mechanism control unit 207 drives the first drive mechanism 203 in accordance with a control command transmitted from the main control unit 211. The first drive mechanism 203 includes the shaft 115 (refer to FIG. 3) that joins the first spherical cap portion 102 to the second spherical cap portion 103, the fourth gear 127 (refer to FIG. 6A) attached to the shaft 115, the drive belt 122 (refer to FIG. 6A) attached to the fourth gear 127, the third gear 126 (refer to FIG. 6A) that transfers driving power to the drive belt 122, the second motor 121 (refer to FIG. 3) connected to the third gear 126, and the frame 119 (refer to FIG. 3) that fixes the second motor 121. The first drive mechanism 203 is a mechanism that controls the rotation of the shaft 115. By rotating the shaft 115, the first drive mechanism 203 rotates the first spherical cap portion 102, the second spherical cap portion 103, the first display portion 108, the second display portion 109, and the third display portion 110 in the pitch direction. In addition, with the rotation in the pitch direction, the optical axis of the range finding sensor 105 and the optical axis of the camera 104 rotate in the pitch direction.

For example, the second drive mechanism control unit 208 includes a control circuit that controls the first motor 118 constituting the second drive mechanism 204. The second drive mechanism control unit 208 drives the second drive mechanism 204 in accordance with a control command output from the main control unit 211. The second drive mechanism 204 includes the first gear 116 (refer to FIG. 7A) fixed to the main casing 101, the second gear 117 (refer to FIG. 7A) meshing with the first gear 116, and the first motor 118 (refer to FIG. 3) connected to the second gear 117. The second drive mechanism 204 is a mechanism that controls the rotation of the main casing 101. By rotating the main casing 101, the second drive mechanism 204 moves the robot.

The weight drive mechanism control unit 209 includes, for example, a control circuit that controls the third motor 125 constituting the weight drive mechanism 205. The weight drive mechanism control unit 209 drives the weight drive mechanism 205 in accordance with a control command transmitted from the main control unit 211. The weight drive mechanism 205 includes the third arm 123 (refer to FIG. 5) that supports one end of the weight 114, the fourth arm 124 that supports the other end of the weight 114, and the third motor 125 (refer to FIG. 5) connected to the fourth arm 124 via the weight shaft 124a. The weight drive mechanism 205 is a mechanism that controls the rotation of the weight 114 around the weight shafts 123a and 124a. By rotating the weight shafts 123a and 124a, the weight drive mechanism 205 causes the weight 114 to tilt to the right or left (in the roll direction).

The power supply control unit 210 manages the charging flag indicating whether the power supply 206 is being charged and a remaining capacity of the power supply 206. The power supply control unit 210 outputs the charging flag and the remaining capacity to the main control unit 211. In addition, when the robot 1 is connected to a charger, the power supply control unit 210 accumulates, in the power supply 206, electric power supplied from the charger.

The power supply 206 is formed from a secondary battery, such as a lithium ion battery, and constitutes the power supply of the robot 1.

The memory 202 includes a down-step information management unit 218. The down-step information management unit 218 stores down-step information indicating the distance from the robot to a down-step located in the vicinity of the robot 1. The down-step information is formed by using, for example, a down-step information table T14 illustrated in FIG. 14. The down-step information table T14 is described in more detail below.

Down-Step Detection Process

Figure 12:
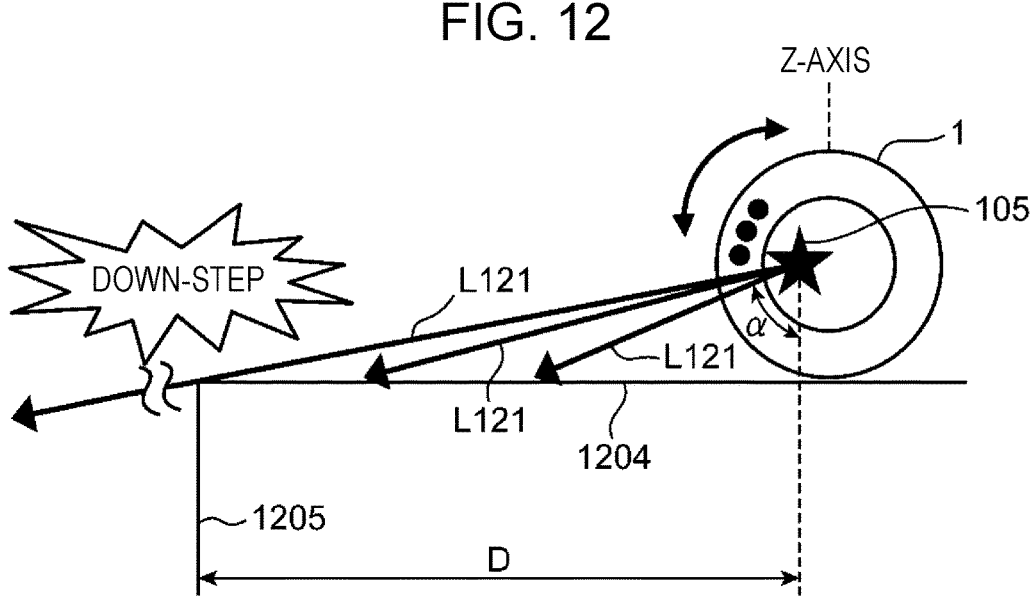
FIG. 12 is a schematic illustration of a down-step detection process adopted by the robot according to the embodiment of the present disclosure.

FIG. 12 is a schematic illustration of a down-step detection process adopted by the robot 1 according to the embodiment of the present disclosure. The robot 1 is positioned on a flat travel surface 1204. A down-step 1205, which is a drop-off of the travel surface 1204, is located in a diagonally forward left direction of the robot 1.

The robot 1 is stationary with the Z-axis oriented to a direction perpendicular to the travel surface 1204 without rotating the weight 114 to the right and left around the weight shafts 123a and 124a. At this time, under the control of the main control unit 211, the first drive mechanism control unit 207 rotates the shaft 115 about the Y-axis in increments of a predetermined unit pitch angle. As a result, the first spherical cap portion 102 and the second spherical cap portion 103 rotate about the Y-axis together with the rotation of the shaft 115 in increments of the unit pitch angle, and the range finding sensor 105 attached to the second spherical cap portion 103 rotates about the Y-axis in increments of the unit pitch angle. Let α be the angle of an optical axis L121 of the range finding sensor 105 relative to the vertical direction. Then, for example, the optical axis L121 of the range finding sensor 105 is changed such that the angle α increases. That is, the direction of the optical axis L121 of the range finding sensor 105 is changed from the downward direction to the upward direction about the shaft 115.

In this case, since the distance between the range finding sensor 105 and the travel surface 1204 along the optical axis L121 gradually increases while the optical axis L121 crosses the travel surface 1204, the measurement value of the range finding sensor 105 gradually increases. Thus, the measurement value of the range finding sensor 105 does not significantly change.

In contrast, as the angle α is increased, the optical axis L121 passes over the down-step 1205. In this case, since the optical axis L121 intersects a lower space (not illustrated) beyond the edge of the down-step 1205, the measurement value of the range finding sensor 105 greatly increases. As a result, the measurement value of the range finding sensor 105 significantly changes.

Accordingly, the main control unit 211 monitors the measurement value of the range finding sensor 105 when the direction of the optical axis L121 is changed in increments of the unit pitch angle and calculates the distance difference between a first distance which is the immediately previous measurement value of the range finding sensor 105 and a second distance which is the measurement value of the range finding sensor 105 measured at present time. Thereafter, if the calculated distance difference is greater than or equal to a predetermined first predetermined value, the main control unit 211 determines that there is a down-step in the forward direction of the robot 1 when the first distance is measured (the direction defined by the current turning angle of the robot 1). However, if the calculated distance difference is less than the first predetermined value, the main control unit 211 determines that there is no down-step in the forward direction of the robot 1.

Subsequently, the main control unit 211 stores, in the down-step information table T14 (refer to FIG. 14), the result of determination related to the presence or absence of a down-step and the distance from the range finding sensor 105 to the down-step. Note that the first predetermined value is, for example, a distance difference estimated when the optical axis L121 changes from a state where the optical axis L121 crosses the travel surface 1204 to a state where the optical axis L121 does not intersect the travel surface 1204 or the value obtained by adding a predetermined margin to the estimated distance difference.

To detect a down-step, it is sufficient that the direction of the optical axis L121 is oriented in substantially the horizontal direction. Therefore, at least 90 degrees is adopted as the upper limit value of the angle α when changing the direction of the optical axis L121 in increments of the unit pitch angle. In addition, as the lower limit value of the angle α when changing the direction of the optical axis L121 in increments of the unit pitch angle, a value obtained by adding a certain small margin, such as 0 degrees, 5 degrees, 10 degrees, or 15 degrees, to 0 degrees is adopted.

Furthermore, as the resolution of the angle α when the direction of the optical axis L121 is changed in increments of the unit pitch angle, a value capable of detecting a down-step having the smallest height difference among the down-steps with high possibility of the robot 1 malfunctioning is adopted. As an example, the resolution of angle α is 1 degree, 5 degrees, or 10 degrees.

Down-Step Information Table

Figure 13:
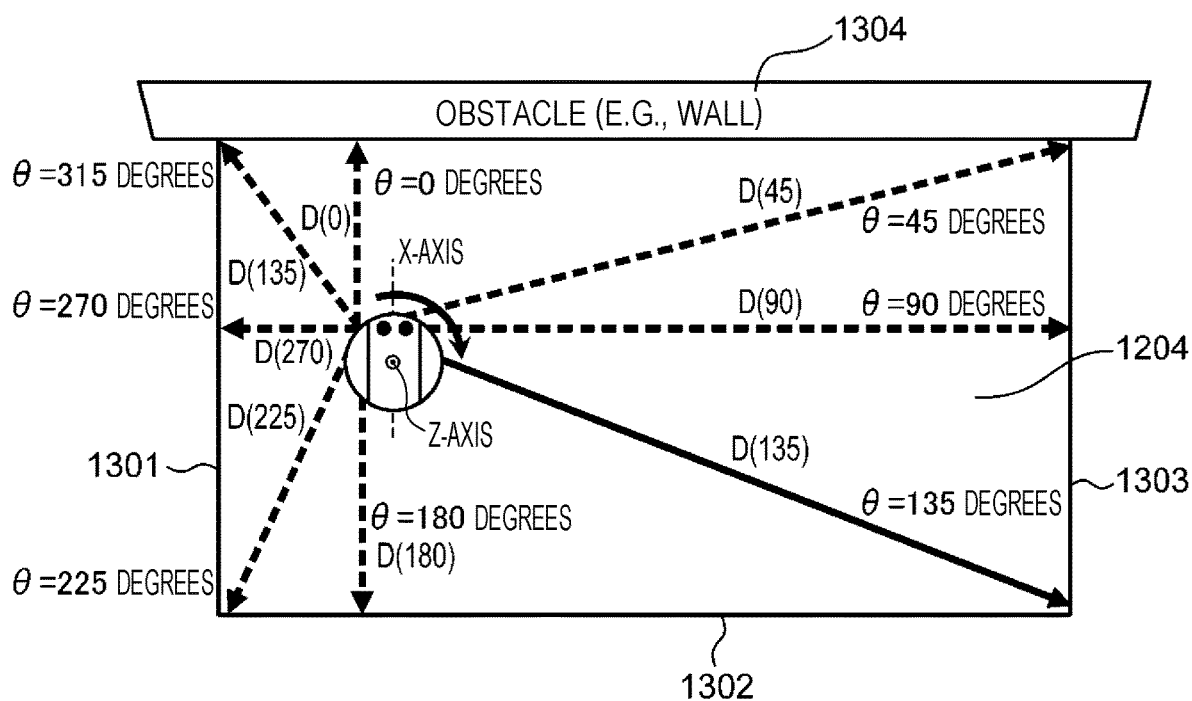
FIG. 13 illustrates the operation performed by the robot which generates a down-step information table.

FIG. 13 illustrates the operation performed by the robot 1 during generation of the down-step information table T14. In plan view of FIG. 13, the robot 1 is stationary with the Z-axis perpendicular to the travel surface 1204 at a position in the travel surface 1204 where an obstacle (e.g., a wall) 1304 is located in front of the robot 1, a down-step 1302 is located in the rear, a down-step 1301 is located on the left, and a down-step 1303 is located on the right.

At this time, the main control unit 211 controls the second drive mechanism control unit 208 to cause the robot 1 to make a pivot turn as described below. Each time a turn difference angle θ becomes 45 degrees, the main control unit 211 changes the direction of the optical axis L121 of the range finding sensor 105 and monitors the measurement value of the range finding sensor 105. In this manner, the main control unit 211 determines whether there is a down-step in front of the robot 1 and stores the result of determination in the down-step information table T14.

FIG. 14 illustrates an example of the data structure of the down-step information table T14. The down-step information table T14 is a database in which one record is allocated to one turn difference angle θ. A "turn difference angle θ", a "distance", and a "down-step" are associated with one another and are stored in the down-step information table T14.

The term "turn difference angle θ" as used herein refers to a turning angle of the robot 1 relative to the initial turning angle of the robot 1. The turning angle of the robot 1 represents the angle of the robot 1 about the Z-axis, that is, the yaw angle of the robot 1. For example, the measurement value of the yaw angle output from the gyro sensor 155 and obtained immediately before the down-step information table T14 is generated is adopted as the initial turning angle. According to the present embodiment, the turn difference angle θ is measured in degrees, for example. However, this is only an example. The turn difference angle θ may be measured in radians.

The "distance" indicates the distance from the range finding sensor 105 to a down-step if the down-step is detected. However, if any down-step is not detected, the distance indicates the distance from the range finding sensor 105 to an object in front. Examples of an object include an obstacle, such as a wall, and a person. According to the present embodiment, the distance is measured in units of cm, for example. Note that if the measurement value of the range finding sensor 105 is directly adopted as the distance from the range finding sensor 105 to a down-step or an object, the measurement value of the range finding sensor 105 is highly likely to be greater than the actual travel distance of the robot 1 to the down-step or the object. This is because the measurement value of the range finding sensor 105 obtained when the distance from the range finding sensor 105 to the down-step or the object is measured is often a measurement value obtained when the optical axis of the range finding sensor 105 is not parallel to the travel surface 1204. Accordingly, the main control unit 211 may calculate the distance from the range finding sensor 105 to the down-step or the object as follows. That is, as illustrated in FIG. 12, let |L121| denote the measurement value of the range finding sensor 105, and let D denote the distance from the range finding sensor 105 to the down-step or the object. Then, the main control unit 211 can calculate the distance D from the range finding sensor 105 to the down-step or the object as follows:

$$D=|L121|\times\sin\alpha \quad (1).$$

Note that since the angle α is the angle of the optical axis of the range finding sensor 105, the main control unit 211 can identify the value of the angle α from the rotation amount of the shaft 115. Referring back to FIG. 14, in the down-step information table T14, a numerical value of "1" is assigned to a record indicating the presence of a down-step, and a numerical value of "0" is assigned to a record indicating the absence of a down-step.

In the example illustrated in FIG. 13, the turning angle of the robot 1 when the frontward direction (the X-axis direction) of the robot 1 is orthogonal to the obstacle (e.g., a wall) 1304 is defined as the initial turning angle. When the turning angle of the robot 1 is the initial turning angle, the turn difference angle θ is 0 degrees.

As described in FIG. 12, when the turn difference angle θ=0 degrees, the main control unit 211 changes the direction of the optical axis L121 of the range finding sensor 105 in increments of the unit pitch angle and calculates the distance difference between the first distance and the second distance first. Thereafter, the main control unit 211 determines whether the distance difference is greater than or equal to the first predetermined value. In the example illustrated in FIG. 13, when the turn difference angle θ=0 degrees, there is an obstacle (e.g., a wall) 1304 in the frontward direction from the front of the robot 1. Accordingly, the distance difference is less than the first predetermined value. Therefore, the main control unit 211 determines that there is no down-step when the turn difference angle θ=0. In addition, since there is no down-step, the main control unit 211 identifies the maximum one of the measurement values of the range finding sensor 105 and calculates the distance D by using Equation (1) together with the identified measurement value, which is a distance D(0) from the range finding sensor 105 to the object when the turn difference angle θ=0. In this example, a value of 30 cm is obtained as the distance D(0).

Accordingly, as illustrated in FIG. 14, "distance=30 cm" and "down-step=0" are registered in the down-step information table T14 in a record corresponding to "turn difference angle θ=0 degrees".

Subsequently, the main control unit 211 controls the second drive mechanism control unit 208 to cause the robot 1 to make a pivot turn so that the frontward direction of the robot 1 is a direction defined by a turn difference angle θ of 45 degrees. Thereafter, in a similar manner to that in the case of a turn difference angle θ of 0 degrees, the main control unit 211 determines the presence or absence of a down-step from the measurement value of the range finding sensor 105. In this example, since there is the obstacle (e.g., a wall) 1304 in the frontward direction from the front of the robot 1, the main control unit 211 determines that there is no down-step. In addition, in a similar manner to that in the case of a turn difference angle θ of 0 degrees, the main control unit 211 calculates a distance D(45) from the range finding sensor 105 to the object when the turn difference angle θ=45 degrees. In this case, a value of 130 cm is obtained as the distance D(45).

Accordingly, as illustrated in FIG. 14, "distance=130 cm" and "down-step=0" are registered in the record of the down-step information table T14 corresponding to "turn difference angle θ=45 degrees".

Subsequently, the main control unit 211 controls the second drive mechanism control unit 208 to cause the robot 1 to make a pivot turn so that the forward direction of the robot 1 is a direction defined by a turn difference angle θ of 90 degrees. Thereafter, in a similar manner to that in the case of a turn difference angle θ of 0 degrees, the main control unit 211 determines the presence or absence of a down-step from the measurement value of the range finding sensor 105. In this example, since there is the down-step 1303 in front of the robot 1, the distance difference between the first distance and the second distance is greater than or equal to the first predetermined value. Accordingly, the main control unit 211 determines that there is a down-step. In addition, the main control unit 211 calculates a distance D(90) from the range finding sensor 105 to the down-step by using the first distance. Since the first distance is the measurement value of the range finding sensor 105, the main control unit 211 calculates the distance D(90) by using Equation (1). In this example, a value of 120 cm is calculated as the distance D(90).

Thus, as illustrated in FIG. 14, "distance=120 cm" and "down-step=1" are registered in the record of the down-step information table T14 corresponding to "turn difference angle θ=90 degrees".

Subsequently, in a similar manner to that in the case of a turn difference angles θ of 0 degrees, the presence/absence of a down-step and the distance D from the range finding sensor 105 to the down-step or the object are calculated for each of the turn difference angles θ=135 degrees, 180 degrees, 225 degrees, 270 degrees, and 315 degrees.

In this example, since there is a down-step in the frontward direction from the front of the robot 1 for each of the turn difference angles θ of 135 degrees, 180 degrees, 225 degrees, and 270 degrees, the distance difference between the first distance and the second distance is greater than or equal to the predetermined first predetermined value and, thus, it is determined that there is a down-step. In addition, the distances D for the above turn difference angles θ are calculated so that D(135)=150 cm, D(180)=50 cm, D(225)=60 cm, and D(270)=25 cm.

In this manner, the calculation results of the distances D represented by the distance D(135) to D(270) are registered in the records of the down-step information table T14 illustrated in FIG. 14 corresponding to turn difference angles θ of 135 degrees, 180 degrees, 225 degrees, and 270 degrees, respectively. In addition "down-step=1" is registered in each of the records.

When the turn difference angle θ=315 degrees, there is an obstacle (e.g., a wall) 1304 in front of the robot 1, and the calculated distance from the range finding sensor 105 to the object is 35 cm. Therefore, in the down-step information table T14 illustrated in FIG. 14, "distance=35 cm" and "down-step=0" are registered in the record corresponding to "turn difference angle θ=315 degrees".

As described above, the down-step information table T14 is generated. In this example, the presence or absence of a down-step and the distance from the range finding sensor 105 to the down-step or the object are registered in the down-step information table T14 for each of the predetermined turn difference angles θ. Consequently, the main control unit 211 can determine in which direction a down-step is present therearound and what the distance from the range finding sensor 105 to the down-step measures. Thus, the main control unit 211 can control the travel of the robot 1 so that the robot 1 does not fall from the down-step.

Note that in the example illustrated in FIG. 14, the resolution of the turn difference angle θ is set to 45 degrees. However, this resolution is only an example, and an angle smaller than 45 degrees (for example, 40 degrees, 35 degrees, 30 degrees, or 25 degrees) may be adopted as the resolution. Alternatively, an angle larger than 45 degrees (for example, 50 degrees, 55 degrees, or 60 degrees) may be adopted as the resolution. In the down-step information table T14, a turn difference angle θ of 0 degrees corresponds to an example of the first turning angle, and turn difference angles θ of 45 degrees, 90 degrees, . . . , 315 degrees are examples of the second turning angle.

Pivot Turn Process

As described in FIG. 8A, if, in the robot 1, the weight 114 is rotated to the left around the weight shafts 123*a* and 124*a* and the first motor 118 is rotated in the forward direction, the robot 1 turns to the left. Similarly, if the weight 114 is rotated to the right around the weight shafts 123*a* and 124*a* and the first motor 118 is rotated in the forward direction, the robot 1 turns to the right.

Hereinafter, these left turn and right turn are collectively referred to as a "normal turn". By making a normal turn, the robot 1 can travel while avoiding a collision with an object in front. However, the turning radius (a second turning radius) of the robot 1 at the time of normal turn is large. Accordingly, if the robot 1 makes a normal turn at, for example, a corner of a desk to generate the down-step information table T14, the robot 1 may fall from the desk.

For this reason, according to the present disclosure, the robot 1 prevents such a fall by making a pivot turn having a turning radius which is smaller than that during a normal turn (a first turning radius).

FIG. 15 illustrates the state of the robot 1 when the pivot turn process is performed. In FIG. 15, a "pivot turn behavioral state" is one of the states of the robot 1 and is a state when the pivot turn process is performed. The robot 1 has four states indicated by "1" to "4" in the pivot turn behavioral state. In the pivot turn process, the robot 1 enters the pivot turn states indicated by "1" to "4" in this order.

The term "control amount set for the weight drive mechanism" refers to the control amount set for the weight drive mechanism 205 that performs a pivot turn process. In this example, the following two kinds of "control amount to be set to the weight drive mechanism" are used: a "right rotation control amount" (an example of a first rotation control amount) and "left rotation control amount" (an example of a second rotation control amount).

The "right rotation control amount" is a control amount to rotate the weight 114 to the right around the weight shafts 123a and 124a, and the "left rotation control amount" is a control amount to rotate the weight 114 to the left around the weight shafts 123a and 124a. The phrase "rotating the weight 114 to the right around the weight shafts 123a and 124a" as used herein refers to rotating the weight 114 counterclockwise around the X-axis by a predetermined angle as viewed from the back to the front, and the phrase "rotating the weight 114 to the left around the weight shafts 123a and 124a" as used herein refers to rotating the weight 114 clockwise around the X-axis by a predetermined angle as viewed from the back to the front.

The term "control amount set for the second drive mechanism" refers to the control amount for the second drive mechanism 204 that performs the pivot turn process. In this example, the following three kinds of control amount for the second drive mechanism 204 are used: a "stop control amount", an "acceleration control amount in the forward direction" (an example of a first acceleration control amount), and an "acceleration control amount in the backward direction" (an example of a second acceleration control amount).

The "stop control amount" is used to stop the rotation of the first motor 118 constituting the second drive mechanism 204. The "acceleration control amount in the forward direction" is used to increase the speed of the robot 1 in the forward direction at a predetermined acceleration. The "acceleration control amount in the backward direction" is used to increase the speed of the robot 1 in the backward direction at a predetermined acceleration.

The main control unit 211 outputs the "stop control amount" to the second drive mechanism control unit 208 first to stop the forward movement and backward movement of the main casing 101. Thereafter, the main control unit 211 outputs the "right rotation control amount" to the weight drive mechanism control unit 209 so that the robot 1 enters the pivot turn state "1". Thus, as illustrated in the column "State of Robot", the weight 114 is tilted to the right by an angle indicated by the arrow 151 with respect to the Z-axis as viewed from the back to the front. As a result, as viewed from the back to the front, the center of gravity of the robot 1 is shifted to the right, and the Z-axis is tilted to the right by the angle indicated by the arrow 151 with respect to a vertical direction DH. The pivot turn state "1" continues until the main control unit 211 confirms that the robot 1 is actually tilted to the right by a predetermined angle by monitoring the measurement value of the roll angle output from the gyro sensor 155 or until a certain period of time elapses after the confirmation.

Subsequently, after outputting the "right rotation control amount" to the weight drive mechanism control unit 209, the main control unit 211 outputs the "acceleration control amount in the forward direction" to the second drive mechanism control unit 208 so that the robot 1 enters the pivot turn state "2". Thus, as illustrated in the column "State of Robot", the robot 1 moves forward with the Z-axis tilted to the right with respect to the vertical direction DH. As a result, when viewed from above, the robot 1 turns forward to the right, as indicated by an arrow 152. The pivot turn state "2" continues until the main control unit 211 confirms that the first motor 118 actually rotates by monitoring the measurement value from a rotary encoder of the first motor 118 or until a certain period of time elapses from the confirmation.

Subsequently, the main control unit 211 outputs the "stop control amount" to the second drive mechanism control unit 208 to stop the forward and backward movement of the main casing 101. Thereafter, the main control unit 211 outputs the "left rotation control amount" to the weight drive mechanism control unit 209 so that the robot 1 enters the pivot turn state "3". Thus, as illustrated in the column "State of Robot", the weight 114 is tilted to the left by an angle indicated by the arrow 153 with respect to the Z-axis as viewed from the back to the front. As a result, as viewed from the back to the front, the center of gravity of the robot 1 is shifted to the left, and the Z-axis is tilted to the left by the angle indicated by the arrow 153 with respect to the vertical direction DH. The pivot turn state "3" continues until the main control unit 211 confirms that the robot 1 is actually tilted to the left by monitoring the measurement value of the roll angle output from the gyro sensor 155 or until a certain period of time elapses after the confirmation.

Subsequently, after outputting the "left rotation control amount" to the weight drive mechanism control unit 209, the main control unit 211 outputs the "acceleration control amount in the backward direction" to the second drive mechanism control unit 208 so that the robot 1 enters the pivot turn state "4". Thus, as illustrated in the column "State of Robot", the robot 1 moves backward with the Z-axis tilted to the left with respect to the vertical direction DH. As a result, when viewed from above, the robot 1 turns backward to the left, as indicated by an arrow 154. The pivot turn state "4" continues until the main control unit 211 confirms that the first motor 118 actually rotates by monitoring the measurement value from the rotary encoder of the first motor 118 or until a certain period of time elapses from the confirmation.

The main control unit 211 defines the series of the pivot turn states "1" to "4" as a pivot turn motion of one cycle and monitors the measurement value of the yaw angle output from the gyro sensor 155. In this manner, the main control unit 211 cyclically performs the pivot turn operation until the turn difference angle θ reaches the unit turning angle (in this case, 45 degrees). If the turn difference angle θ reaches the unit turning angle, the main control unit 211 performs a process for determining the presence or absence of a down-step described in FIG. 12 and registers the result of determination in the down-step information table T14.

As described above, since the pivot turn is a turn that repeatedly make a forward turn to the right and a backward turn to the left in small motions, the turning radius can be reduced more than that in a normal turn. As a result, the robot 1 can determine whether a down-step is present in the surroundings while minimizing the movement amount. In this manner, even in a place such as a corner of a desk where the robot 1 is surrounded by down-steps, the robot 1 can turn without falling from the down-step.

Determination of Travel Direction

After the robot 1 performs the pivot turn process and generates the down-step information table T14, the robot 1 determines the travel direction and moves in the determined direction.

Figure 16:
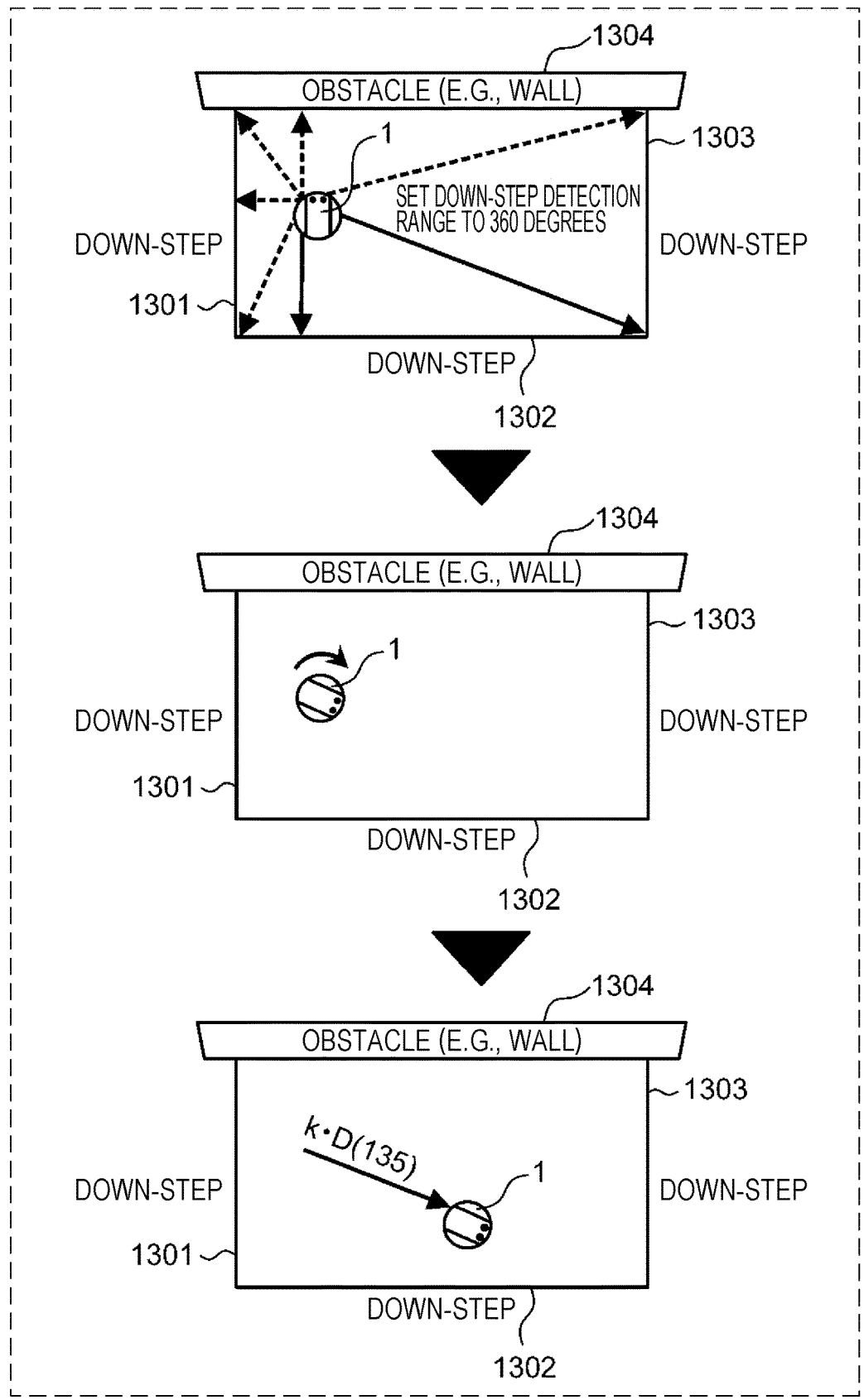
FIG. 16 illustrates a process for determining the travel direction of the robot in the case where a person is not detected in the vicinity of the robot.

FIG. 16 illustrates a process for determining the travel direction of the robot 1 in the case where a person is not detected around the robot 1. The upper section of FIG. 16 is the same as FIG. 13. At this time, the main control unit 211 causes the robot 1 to make a pivot turn and generate the down-step information table T14. However, at this time, since there is no person around the robot 1, the main control unit 211 sets a down-step detection range, which indicates the turning range of the pivot turn, to 360 degrees. Hereinafter, the down-step detection range set to 360 degrees is referred to as a "down-step detection range R16". As a result, the main control unit 211 turns the robot 1 in increments of the unit turning angle within the down-step detection range R16, performs a process for determining the presence or absence of a down-step, and registers the result of determination in the down-step information table T14.

After generating the down-step information table T14, the main control unit 211 performs a process for determining the travel direction of the robot 1. In this example, as illustrated in the middle section of FIG. 16, the direction corresponding to the largest distance among the distances in the down-step detection range R16 registered in the down-step information table T14 is determined as the travel direction of the robot 1. In the example illustrated in FIG. 14, since the distance corresponding to the direction defined by a turn difference angle θ of 135 degrees is 150 cm and is the largest distance, the main control unit 211 selects the direction defined by a turn difference angle θ of 135 degrees as the travel direction of the robot 1. Thereafter, the main control unit 211 causes the robot 1 to make a pivot turn so that the front of the robot 1 faces the direction defined by a turn difference angle θ of 135 degrees. More specifically, the main control unit 211 monitors the measurement value of the yaw angle output from the gyro sensor 155 and causes the robot 1 to make a pivot turn until the front of the robot 1 faces the direction defined by a turn difference angle θ of 135 degrees.

Subsequently, the main control unit 211 determines the movement distance of the robot 1. For example, as illustrated in the lower section of FIG. 16, the main control unit 211 can calculate a value obtained by multiplying the distance D from the current position of the robot 1 to the down-step or object by a predetermined coefficient k (=D·k) as the movement distance of the robot 1. In this example, a value k that is greater than 0 and less than 1 can be adopted. In the example illustrated in the right section of FIG. 13, the coefficient k is set to 0.5, for example. Therefore, the movement distance of the robot 1 is set to 75 cm (=k·D (135)), which is obtained by multiplying the distance D(135) from the robot 1 to the down-step 1303 (=150 cm) by the coefficient k.

Subsequently, the main control unit 211 outputs, to the second drive mechanism control unit 208, a constant-speed control amount used to move the robot 1 forward from the current position at a first speed by the determined movement distance. As a result, the first motor 118 rotates in the forward direction, and the main casing 101 rotates. Thus, the robot 1 moves by the determined movement distance. After moving by the determined movement distance, the robot 1 stops its movement.

Note that the main control unit 211 can calculate the remaining distance by calculating the current movement distance of the robot 1 by using the measurement value in the X-axis direction output from the acceleration sensor 120. In addition, the main control unit 211 can calculate the current travel speed of the robot 1 by using the measurement value in the X-axis direction output from the acceleration sensor 120.

According to the present disclosure, the robot 1 is designed to autonomously move like a pet and to be loved by a person. Therefore, when a person is present around the robot 1 and if the robot 1 autonomously travels without paying attention to the presence of the person, the person may be less emotionally attached to the robot 1. To let the person become more emotionally attached to the robot 1, it is effective to move the robot 1 towards the person when the person is located around the robot 1. However, if there is a down-step in the direction toward the person, the robot 1 may fall from the down-step. For this reason, simply moving the robot 1 towards the person is not adequate.

Figure 17:
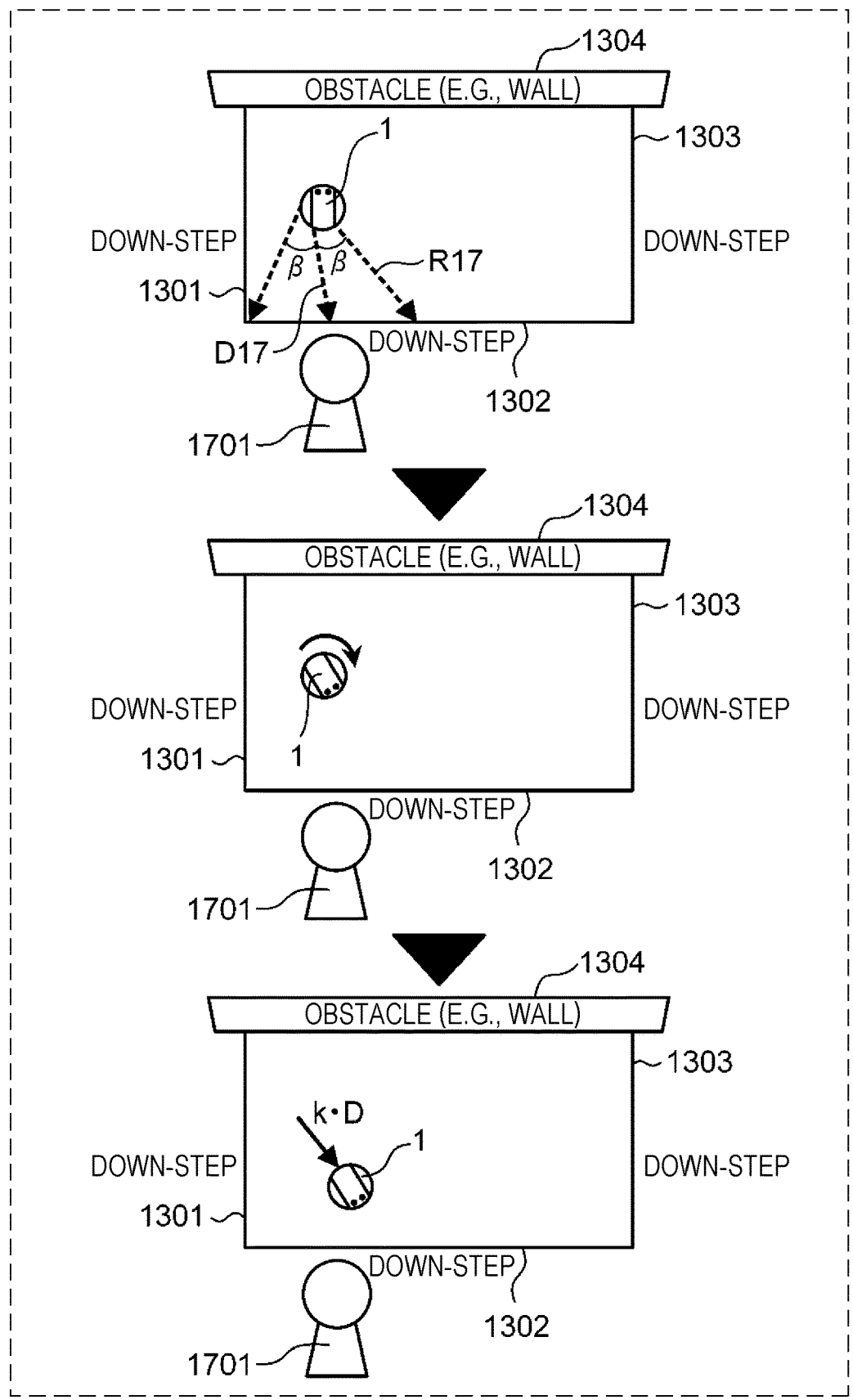
FIG. 17 illustrates a process for determining the travel direction of the robot when a person located around the robot is detected.

Therefore, according to the present disclosure, if a person is present around the robot 1, the travel direction of the robot 1 is determined in a manner described below. FIG. 17 illustrates a process for determining the travel direction of the robot 1 when a person present around the robot 1 is detected.

As illustrated in the upper section of FIG. 17, upon detecting a person 1701 around the robot 1, the main control unit 211 sets a down-step detection range R17 to a certain range including the person 1701. In this example, the down-step detection range R17 is set to, for example, a range of plus and minus rotation angle β from the direction D17 extending from the robot 1 toward the person 1701. In this example, since the robot 1 moves toward the person 1701, the angle β is set to about 45 degrees. However, this angle is only an example.

Thereafter, within the down-step detection range R17, the main control unit 211 turns the robot 1 in increments of the unit turning angle, performs a process for determining the presence or absence of a down-step, and registers the result of determination in the down-step information table T14. In this case, the information regarding the presence or absence of a down-step and the distance from the robot 1 to the down-step are registered in the down-step information table T14 for each of the turn difference angles θ within the rotation range of the robot 1 (within the down-step detection range R17, that is, a range of plus and minus rotation angle β from the direction D17 instead of a range of 360 degrees).

After generation of the down-step information table T14 is completed, the main control unit 211 performs a process for determining the travel direction. In this example, as illustrated in the middle section of FIG. 16, the direction corresponding to the largest distance among the distances within the down-step detection range R17 registered in the down-step information table T14 is selected as the travel direction of the robot 1. Thereafter, the main control unit 211 causes the robot 1 to make a pivot turn so that the front of the robot 1 faces in the direction corresponding to the largest distance within the down-step detection range R17.

Subsequently, the main control unit 211 determines the movement distance of the robot 1. Let D be the largest distance within the down-step detection range R17. Then, as illustrated in the lower section of FIG. 17, the main control unit 211 selects the value obtained by multiplying the distance D by the coefficient k (=k·D) as the movement distance. Thereafter, the main control unit 211 moves the robot 1 the determined movement distance by using a method that is the same as the method described in FIG. 16.

As described above, according to the present disclosure, even when there is a down-step at the movement destination of the robot 1, the robot 1 is prevented from falling from the down-step since the movement distance is calculated by multiplying the distance D from the robot 1 to the down-step by the coefficient k. In addition, if a person is detected, the robot 1 can travel toward the person while being prevented from falling from the down-step, since the area of a certain range around the person is set as the down-step detection range R17.

Flowchart

Figure 18:
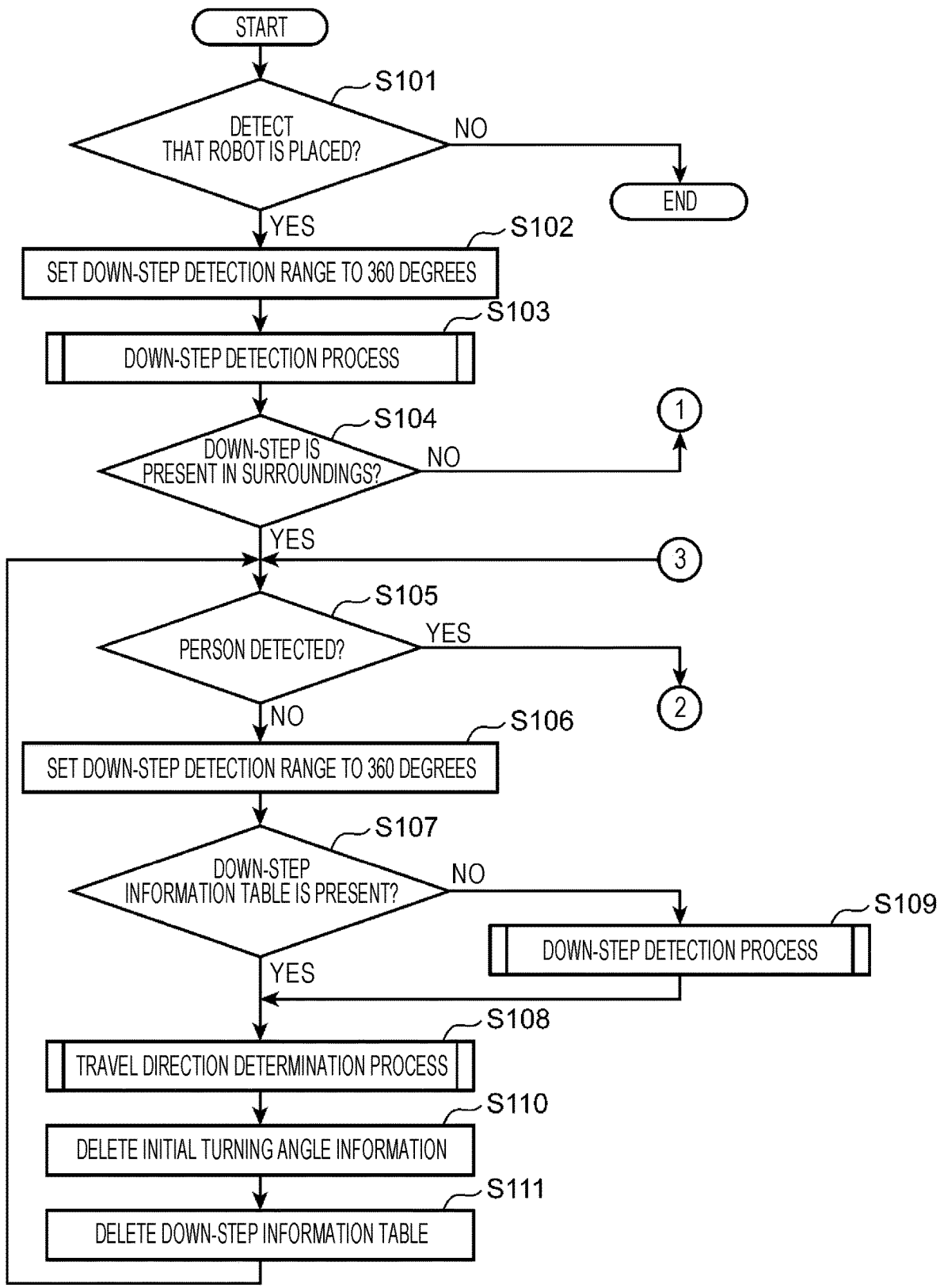
FIG. 18 is a flowchart of a process performed by the robot according to the embodiment of the present disclosure.

FIG. 18 is a flowchart of the process performed by the robot 1 according to the embodiment of the present disclosure. The main control unit 211 detects whether the robot 1 is placed on the travel surface first (S101). If the measurement value output from the gyro sensor 155 is the value indicating that the robot 1 is not shaking for a certain period of time, the main control unit 211 can detect that the robot 1 is placed on the travel surface. More specifically, if the three measurement values output from the gyro sensor 155, that is, the measurement values of the row angle, the pitch angle, and the yaw angle converge on values within ranges indicating that the robot 1 is not shaking for a certain period of time, the main control unit 211 can determine that the robot 1 is placed on the travel surface. However, if at least one of the three measurement values output from the gyro sensor 155, that is, at least one of the measurement values of the low angle, the pitch angle, and the yaw angle does not converge on a value within the predetermined range for a certain period, the main control unit 211 can determine that the robot 1 is not placed on the travel surface.

If it is detected that the robot 1 is placed on the travel surface (YES in S101), the main control unit 211 sets the down-step detection range to 360 degrees (S102). However, if it is not detected that the robot 1 is placed on the travel surface (NO in S101), the robot 1 is highly likely to be held by a person, for example. Thus, the process is completed.

Subsequently, the main control unit 211 performs a down-step detection process (S103). The down-step detection process is described in detail below with reference to FIG. 21.

Subsequently, if the processing result of the down-step detection process indicates that there is no down-step in any direction in 360 degrees around the robot 1 (NO in S104), the processing proceeds to S201 in FIG. 19. However, if the processing result of the down-step detection process indicates that there is a down-step in any one of the directions in 360 degrees around the robot 1 (YES in S104), the main control unit 211 determines whether there is a person around the robot 1 (S105).

Thereafter, the main control unit 211 determines whether the audio data acquired by the microphone 106 includes the voice of any one of the persons stored in the voice identification table. If it is determined that the voice of the person is included, the main control unit 211 reads the feature of the face of the person from the above-described face identification table. Subsequently, the main control unit 211 determines whether the image of face of the person is included in the image data acquired by the camera 104 by using the feature of the read face. If it is determined that the image of face of the person is included in the image data, the main control unit 211 can determine that a person can be detected.

Note that if the main control unit 211 determines that the speech data of the person is included in the audio data acquired by the microphone 106, the main control unit 211 may further analyze the content of the speech. If a predetermined keyword indicating that the person calls the robot 1 is included in the content of the speech, a process for detecting the face of the person may be performed by using the image data.

While the above description has been given with reference to the main control unit 211 that detects the presence or absence of a person by using both the audio data and the image data, the process is only an example. The main control unit 211 may detect the presence or absence of a person by using one of the audio data and the image data.

If, in S105, the main control unit 211 cannot detect a person (NO in S105), the main control unit 211 need not move the robot 1 toward a person. Accordingly, the main control unit 211 sets the down-step detection range to 360 degrees (S106). However, if the main control unit 211 can detect a person (YES in S105), the processing proceeds to S301 in FIG. 20 in order to cause the robot 1 to travel toward the person.

Subsequently, the main control unit 211 determines whether the down-step information table T14 is present in the memory 202 (S107). If the down-step information table T14 is present in the memory 202 (YES in S107), the main control unit 211 performs a travel direction determination process (S108). However, if the down-step information table T14 is not present in the memory 202 (NO in S107), the main control unit 211 performs a down-step detection process (S109). The travel direction determination process is described in more detail below with reference to FIG. 24. In addition, the down-step detection process is described in more detail below with reference to FIG. 21.

The down-step information table T14 is generated each time the down-step detection process is performed. In addition, the down-step information table T14 is deleted each time the travel direction determination process ends. Accordingly, in S107 performed immediately after the robot 1 is placed on the travel surface, the determination is YES since the down-step information table T14 has been generated in the down-step detection process in S103.

Subsequently, since the travel direction determination process has been completed, the main control unit 211 deletes initial turning angle information (S110). Note that the initial turning angle information is information indicating the initial turning angle to be used as a reference of the turn difference angle θ. The initial turning angle information is set each time the down-step detection process is performed, and the initial turning angle information is deleted each time the travel direction determining process is performed.

Subsequently, since the travel direction determination process has been completed, the main control unit 211 deletes the down-step information table T14 from the memory 202 (S111). Thereafter, the processing returns to S105.

Referring to the entire process flow of FIG. 18, if the robot 1 is placed on the travel surface, the down-step detection range is set to 360 degrees. Thereafter, the down-step detection process (S103) is performed to generate the down-step information table T14. Subsequently, if there is no down-step and there is no person around, the travel direction determination process (S108) is performed and, thus, the movement direction and the movement distance are determined. The robot 1 moves in the determined movement direction by the determined movement distance. Thereafter, the processes in S105 to S111 are repeated unless a person or a down-step is detected in the surroundings and, thus, the robot 1 repeats its movement.

Figure 19:
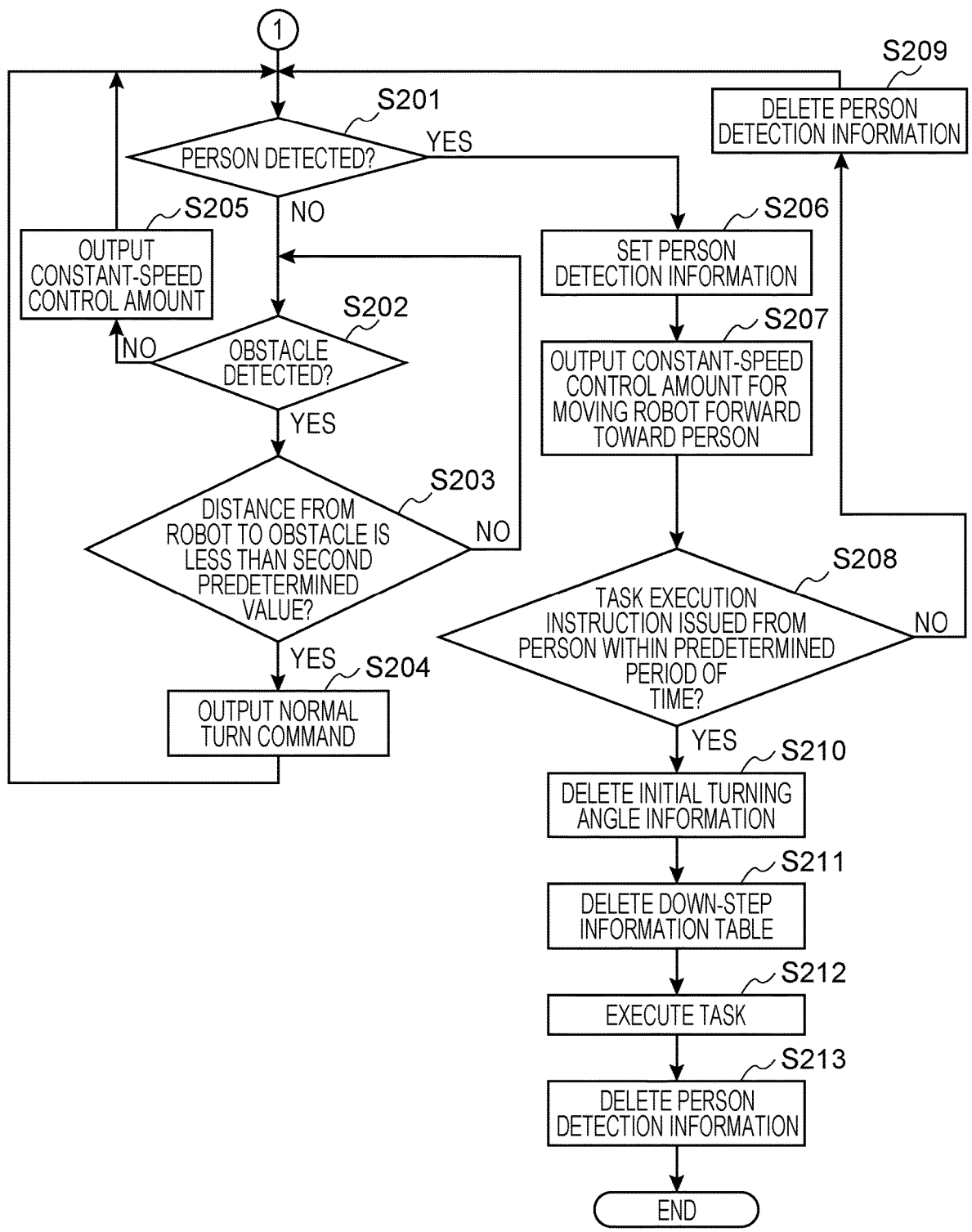
FIG. 19 is a continuation of the flowchart of FIG. 18 when there is no down-step in the vicinity (NO in S104)

FIG. 19 is a continuation of the flowchart of FIG. 18 when it is determined in FIG. 18 that there is no down-step in the surroundings (NO in S104). The main control unit 211 detects whether a person is present around the robot 1 first (S201). The details of the process in S201 are the same as those in S105, and description of the process in S201 is not repeated.

If, in S201, the main control unit 211 cannot detect a person (NO in S201), the main control unit 211 detects whether there is an obstacle in front (S202). If an obstacle is detected (YES in S202), the main control unit 211 obtains the distance from the robot 1 to the obstacle from the measurement value output from the range finding sensor 105 and determines whether the distance from the robot 1 to the obstacle is less than the second predetermined value (S203).

If the distance from the robot 1 to the obstacle is less than the second predetermined value (YES in S203), the main control unit 211 outputs a normal turn command to cause the robot 1 to make a normal turn in order to avoid collision with an obstacle (S204). Thereafter, the processing returns to S201. As the second predetermined value, the following distance is employed: the shortest one of distances for which the robot 1 is highly likely not to collide with the obstacle when the robot 1 makes a normal turn, for example.

In this example, if the main control unit 211 causes the robot 1 to make a normal turn to the right, the main control unit 211 outputs the right rotation control amount illustrated in FIG. 15 to the weight drive mechanism control unit 209, so that the Z-axis of the robot 1 is tilted to the right with respect to the vertical direction. Thereafter, while maintaining this state of the robot 1, the main control unit 211 outputs, to the second drive mechanism control unit 208, a deceleration control amount for reducing the travel speed of the robot 1 to the second speed that is lower than the first speed which is the highest travel speed of the robot 1 that travels forward. In this case, the normal turn command is composed of the right rotation control amount and the deceleration control amount. As a result, the robot 1 can turn to the right and pass around the obstacle.

While the above description has been given with reference to the robot 1 that turns to the right, the robot 1 may turn to the left. In this case, instead of outputting the right rotation control amount, the main control unit 211 can output the left rotation control amount to the weight drive mechanism control unit 209.

However, if, in S202, the main control unit 211 does not detect an obstacle (NO in S202), the main control unit 211 outputs the constant-speed control amount to the second drive mechanism control unit 208 (S205). Thereafter, the processing returns to S201. As a result, the robot 1 continues to travel.

If, in S203, the distance from the robot 1 to the obstacle is larger than or equal to the second predetermined value (NO in S203), the processing performed by the main control unit 211 returns to S202. That is, if, in S202, the main control unit 211 detects the obstacle, the main control unit 211 waits until the distance from the robot 1 to the obstacle becomes less than the second predetermined value and, thereafter, turns the robot 1.

If, in S201, the main control unit 211 detects a person (YES in S201), the main control unit 211 stores the person detection information in the memory 202 (S206). In a process for determining the travel direction illustrated in FIG. 24, the person detection information is used to, when the largest value of the distance is acquired from the down-step detection range, determine whether the down-step detection range is set to 360 degrees or a certain range including a person.

Subsequently, the main control unit 211 outputs, to the second drive mechanism control unit 208, the constant-speed control amount for moving the robot 1 forward toward the person at the first speed (S207). As a result, the robot 1 moves forward toward the person.

Subsequently, the main control unit 211 determines whether a task execution instruction has been issued from the person within a predetermined period of time after the robot 1 starts moving forward toward the person (S208).

An example of the task of the robot 1 is a task that causes the robot to play with a person, such as a rock-paper-scissors game or a reading of a book to the person.

The person may issue a task execution instruction by voice, such as "Let's do a rock-paper-scissors game" or "Read a picture book to me". For example, if a predetermined keyword indicating a task execution instruction issued from the person is contained in the voice data acquired by the microphone 106 within a predetermined period of time after the start of the forward movement of the robot 1 toward a person in S207, the main control unit 211 can determine that a task execution instruction is issued from the person.

If, in S208, a task execution instruction is issued from the person (YES in S208), the main control unit 211 deletes the initial turning angle information and the down-step information table T14 currently stored in the memory 202 (S210, S211).

However, if no task execution instruction is issued from the person (NO in S208), the main control unit 211 deletes the person detection information (S209). Thereafter, the processing returns to S201.

In S212, the main control unit 211 performs the task indicated by the person (S212). For example, if a rock-paper-scissors game is to be played, the main control unit 211 can output, to the person, a speech prompt to play a rock-paper-scissors game from the loudspeaker 107. Thereafter, the main control unit 211 can perform a process to recognize the shape formed by the person with their hand from the image data acquired by the camera 104 and determine which one of the person and the robot 1 wins. Subsequently, the main control unit 211 can output, from the loudspeaker 107, a voice message indicating which one wins.

Subsequently, the main control unit 211 deletes the person detection information from the memory 202 (S213) and ends the processing.

Referring to the entire flow of FIG. 19, if neither a person nor an obstacle is detected (NO in S201 and NO in S202), the robot 1 continues to move forward (S205). If the robot 1 detects an obstacle (YES in S202), the robot 1 carries out autonomous travel so as to pass around the obstacle by making a normal turn (S204). If the robot 1 detects a person (YES in S201), the robot 1 travels toward a person (S207). If the robot 1 receives a task execution instruction from the person, the robot 1 executes the task (S212). In this manner, the robot 1 can behave as if it were friendly to the person, and this behavior can cause the person to be more emotionally attached to the robot 1.

Figure 20:
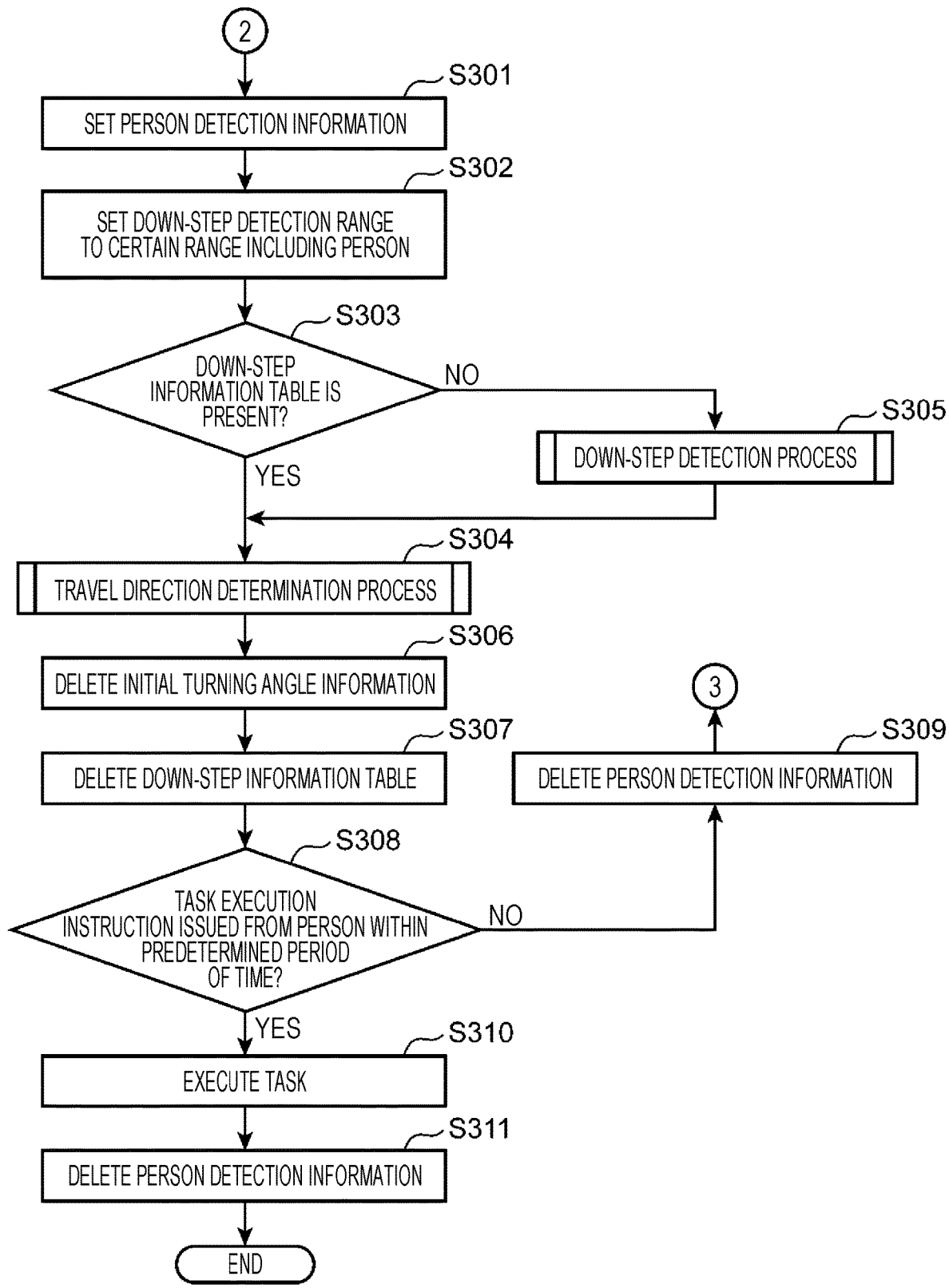
FIG. 20 is a continuation of the flowchart in FIG. 18 when a person is detected (YES in S105)

FIG. 20 is a continuation of the flowchart in FIG. 18 when a person is detected (YES in S105). Since a person has been detected, the main control unit 211 sets the person detection information first (S301).

Subsequently, the main control unit 211 sets a down-step detection range to a certain range including the person (S302). Thereafter, if the down-step information table T14 is present in the memory 202 (YES in S303), the processing performed by the main control unit 211 proceeds to S304.

However, if the down-step information table T14 is not present in the memory 202 (NO in S303), the main control unit 211 performs the down-step detection process (S305), and the processing proceeds to S304. In this manner, the robot 1 makes a pivot turn within the down-step detection range set to the certain range including the person and generates a down-step information table T14.

Subsequently, the main control unit 211 performs the travel direction determination process (S304). Thereafter, the processing proceeds to S306. As a result, in the down-step detection range set to the certain range including the person, the robot 1 moves, for example, in a direction in which the distance from the robot 1 to an obstacle or a down-step is the largest by a movement distance determined on the basis of the largest distance.

In S306, since the travel direction determination process is completed, the main control unit 211 deletes the initial turning angle information and the down-step information table T14 from the memory 202 (S306, S307).

Subsequently, the main control unit 211 determines whether a task execution instruction has been issued from the person within a predetermined period of time since the person detection information was set (S308). If an instruction to perform the task has been issued (YES in S308), the main control unit 211 performs the task (S310), deletes the person detection information from the memory 202 (S311), and ends the processing. However, if no task execution instruction has been issued (NO in S308), the main control unit 211 deletes the person detection information from the memory 202 (S309). Upon completion of S309, the processing returns to S105 in FIG. 18, where the presence or absence of a person is detected.

Referring to the entire flow of FIG. 20, in the down-step detection range set to a certain set range including a person, the robot 1 is moved in a direction in which the distance from the robot 1 to an obstacle or a down-step is the largest. If the robot 1 receives a task execution instruction from the person, the robot 1 executes the task. Since the down-step detection range is set to the certain range including the person, the robot 1 moves toward the person. As a result, it is possible to provide an environment in which the person can easily instruct the robot 1 to execute the task.

Figure 21:
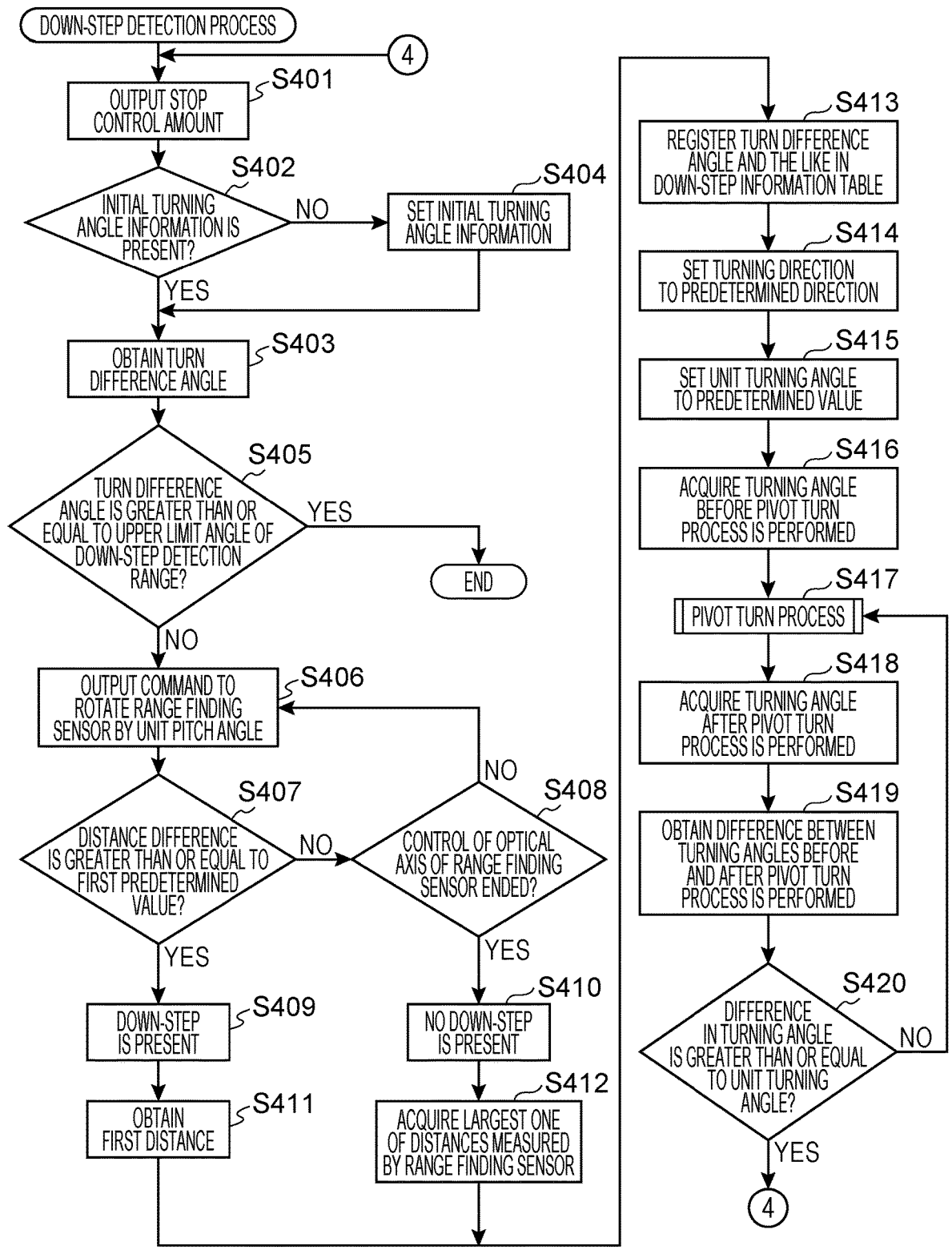
FIG. 21 is a flowchart illustrating the details of the down-step detection process.

FIG. 21 is a flowchart illustrating the details of the down-step detection process. The main control unit 211 outputs the stop control amount to the second drive mechanism control unit 208 first (S401). As a result, the robot 1 is stopped.

Subsequently, if the initial turning angle information is not stored in the memory 202 (NO in S402), the main control unit 211 acquires the current turning angle from the gyro sensor 155 and sets the initial turning angle information to the acquired turning angle (S404). Thereafter, the processing proceeds to S403.

However, if the initial turning angle information is stored in the memory 202 (YES in S402), the processing proceeds to S403 without performing the process in S404.

Subsequently, the main control unit 211 acquires the current turning angle from the gyro sensor 155 and obtains the turn difference angle θ by calculating the difference between the obtained turning angle and the initial turning angle (S403).

Subsequently, the main control unit 211 determines whether the turn difference angle θ is greater than or equal to the upper limit angle of the down-step detection range (S405). At this time, if the down-step detection range is set to 360 degrees, the upper limit angle is 360 degrees. However, if the down-step detection range is set to the certain range including the person, the upper limit angle is the upper limit angle of the certain range.

In S405, if the turn difference angle θ is larger than or equal to the upper limit angle of the down-step detection range (YES in S405), the down-step detection process ends. However, if the turn difference angle θ is smaller than the upper limit angle of the down-step detection range (NO in S405), the main control unit 211 outputs, to the first drive mechanism control unit 207, a command to rotate the optical axis of the range finding sensor 105 by the unit pitch angle (S406). As a result, the optical axis of the range finding sensor 105 changes by a unit pitch angle about the Y-axis. In this example, the main control unit 211 increases the angle α (refer to FIG. 12) of the optical axis of the range finding sensor 105 in increments of the unit pitch angle within a range of a predetermined lower limit value to a predetermined upper limit value. However, this is only an example, and the angle α of the optical axis of the range finding sensor 105 may be decreased from the upper limit value to the lower limit value in increments of the unit pitch angle. Alternatively, the angle α may be increased from a predetermined default value in the range of the upper limit value to the lower limit value to the upper limit value in increments of the unit pitch angle first. If the angle α reaches the upper limit value, the angle α may be set to the lower limit value. Thereafter, the angle α may be increased from the lower limit value to the default value in increments of the unit pitch angle.

Subsequently, the main control unit 211 calculates the distance difference between a first distance which is the immediately pervious measurement value output from the range finding sensor 105 and a second distance which is the current measurement value output from the range finding sensor 105. Thereafter, the main control unit 211 determines whether the distance difference is greater than or equal to the first predetermined value (S407).

If the distance difference is greater than or equal to the first predetermined value (YES in S407), the main control unit 211 determines that there is a down-step in the frontward direction of the robot 1 when the first distance is measured (S409).

Subsequently, the main control unit 211 calculates the distance D(θ) by using Equation (1) together with the first distance, acquires the distance D(θ) as the distance from the robot 1 to the down-step (S411), and registers, in the down-step information table T14, the distance D(θ) in association with the current turn difference angle θ (S413). At this time, since there is a down-step, the information "down-step=1" is further registered in the down-step information table T14.

However, if the distance difference is less than the first predetermined value (NO in S407), the main control unit 211 determines whether the control of the optical axis of the range finding sensor 105 has ended (S408). At this time, for example, if the angle α of the optical axis of the range finding sensor 105 reaches the predetermined upper limit value, the main control unit 211 can determine that the control of the optical axis has ended.

If the main control unit 211 determines that the control of the optical axis of the range finding sensor 105 has ended (YES in S408), the main control unit 211 determines that there is no down-step in the direction defined by the current turn difference angle θ (S410).

Subsequently, the main control unit 211 acquires, from among the distances measured by the range finding sensor 105 that changes the optical axis thereof in increments of the unit pitch angle within the range of the lower limit value to the upper limit value, the largest distance (S412).

Subsequently, the main control unit 211 calculates the distance D(θ) by using Equation (1) together with the largest distance acquired in S412 and registers the distance D(θ) in the down-step information table T14 in association with the current turn difference angle θ (S413). At this time, since there is no down-step, the information of "down-step=0" is further registered in the down-step information table T14.

Subsequently, the main control unit 211 sets the turning direction to a predetermined direction (S414). The process in S414 is provided to fix the turning direction of the robot 1 to a predetermined direction during a single down-step detection process. Accordingly, if the robot 1 is turned, for example, clockwise (a right hand turn) during a single down-step detection process, the turning direction is fixed to the right hand turn in S414. However, for example, if the robot 1 is turned counterclockwise (a left hand turn), the turning direction is fixed to the left hand turn in S414.

Subsequently, the main control unit 211 sets the unit turning angle to a predetermined value (S415). As illustrated in FIG. 13, if the unit turning angle is, for example, 45 degrees, the unit turning angle is set to 45 degrees in S415.

Subsequently, the main control unit 211 acquires, from the gyro sensor 155, the turning angle before the pivot turn process is performed (S416). In this example, the measurement value of the yaw angle output from the gyro sensor 155 is acquired as the turning angle before the pivot turn process is performed.

Subsequently, the main control unit 211 performs the pivot turn process (S417). The pivot turn process is described in detail below with reference to FIG. 22.

Subsequently, the main control unit 211 acquires, from the gyro sensor 155, the turning angle after the pivot turn process is performed (S418). Subsequently, the main control unit 211 obtains the difference between the turning angles before and after the pivot turn process is performed, that is, the difference between the turning angle acquired in S416 and the turning angle acquired in S418 (S419).

Subsequently, if the difference in the turning angle obtained in S419 is less than the unit turning angle (NO in S420), the processing performed by the main control unit 211 returns to S417, where the main control unit 211 performs the pivot turn process again (S417).

However, if the difference between the turning angles obtained in S419 is greater than or equal to the unit turning angle (YES in S420), the main control unit 211 was able to turn the robot 1 by the unit turning angle. Accordingly, the processing returns to S401 in order to determine whether a down-step is present in the direction defined by the turning angle.

By repeating the processing from S417 to S420, the robot 1 turns through the unit turning angle.

Referring to the entire flow of FIG. 21, at the initial turning angle, the optical axis of the range finding sensor 105 is rotated in increments of the unit pitch angle to detect the presence or absence of a down-step first. Thereafter, the robot 1 is turned through the unit turning angle, and the optical axis of the range finding sensor 105 is rotated in increments of the unit pitch angle to detect the presence or absence of a down-step. Subsequently, until the turn difference angle θ reaches the upper limit angle of the down-step detection range, the robot 1 is turned in increments of the unit turning angle and detects the presence or absence of a down-step.

Figure 22:
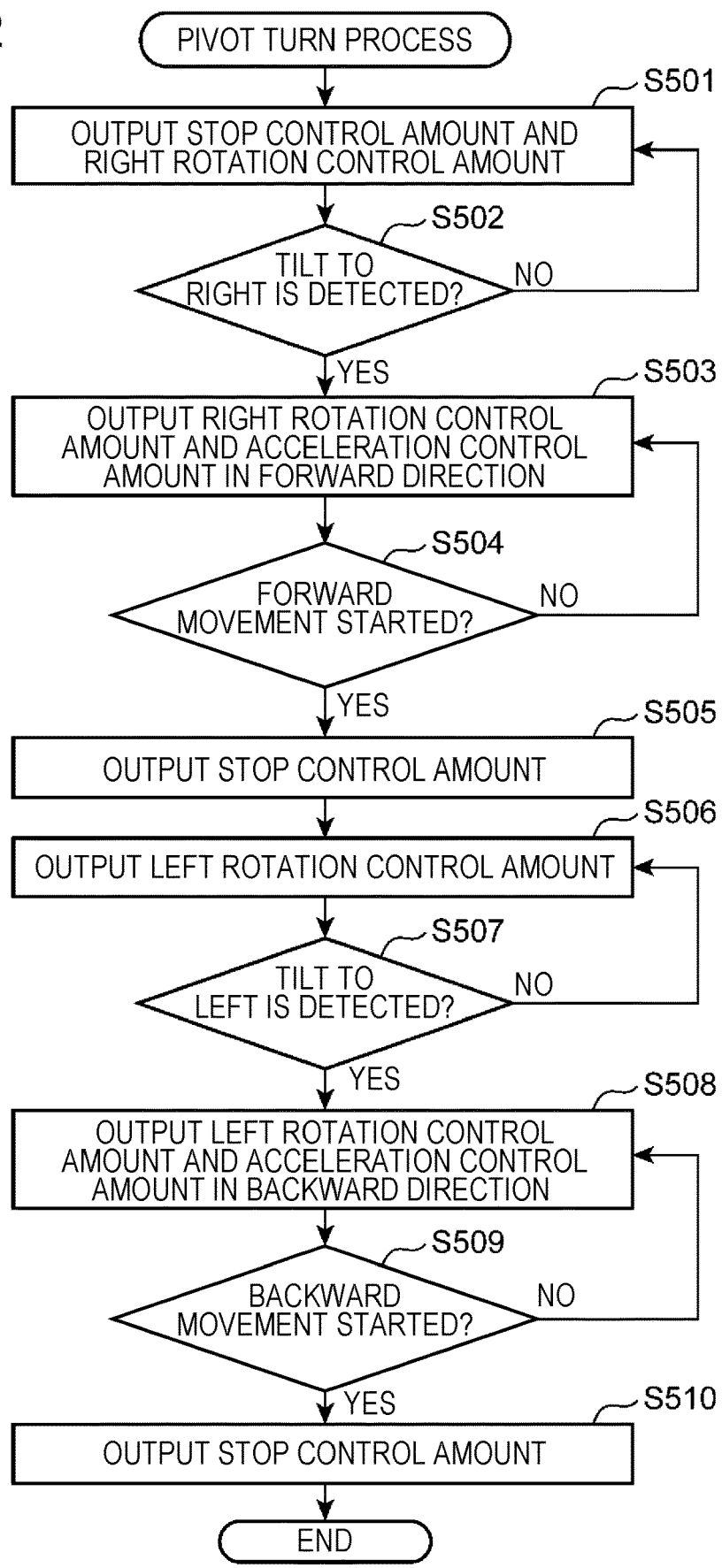
FIG. 22 is a flowchart illustrating the details of the pivot turn process.

FIG. 22 is a flowchart illustrating the details of the pivot turn process. The main control unit 211 outputs the stop control amount to the second drive mechanism control unit 208 and outputs the right rotation control amount to the weight drive mechanism control unit 209 first (S501). As a result, as illustrated in FIG. 15, the robot 1 enters the pivot turn behavioral state "1".

Subsequently, the main control unit 211 monitors the measurement value of the roll angle output from the gyro sensor 155 and detects whether the robot 1 is actually tilted to the right by a predetermined angle (S502). Thereafter, if the main control unit 211 cannot detect that the robot 1 is actually tilted to the right by the predetermined angle (NO in S502), the processing performed by the main control unit 211 returns to S501. However, if the main control unit 211 can detect that the robot 1 is actually tilted to the right by the predetermined angle (YES in S502), the processing proceeds to S503. That is, the processes in S501 and S502 continue until it is detected that the robot 1 is actually tilted to the right by the predetermined angle.

Subsequently, the main control unit 211 outputs the right rotation control amount to the weight drive mechanism control unit 209 and outputs the acceleration control amount in the forward direction to the second drive mechanism control unit 208 (S503). As a result, as illustrated in FIG. 15, the robot 1 enters the pivot turn behavioral state "2".

Subsequently, the main control unit 211 monitors the measurement value output from the rotary encoder of the first motor 118 and detects whether the robot 1 has actually started moving forward (S504). If the robot 1 cannot detect that the robot 1 has actually started moving forward (NO in S504), the processing performed by the main control unit 211 returns to S503. However, if the main control unit 211 can detect that the robot 1 has actually started moving forward (YES in S504), the processing proceeds to S505. That is, the processes in S503 and S504 continue until the main control unit 211 detects that the robot 1 has actually started moving forward.

Subsequently, the main control unit 211 outputs the stop control amount to the second drive mechanism control unit 208 (S505) and outputs the left rotation control amount to the weight drive mechanism control unit 209 (S506). As a result, as illustrated in FIG. 15, the robot 1 enters the pivot turn behavioral state "3".

Subsequently, the main control unit 211 monitors the measurement value of the roll angle output from the gyro sensor 155 and detects whether the robot 1 is actually tilted to the left by a predetermined angle (S507). Thereafter, if the robot 1 cannot detect that the robot 1 is actually tilted to the left by a predetermined angle (NO in S507), the processing performed by the main control unit 211 returns to S506. However, if the main control unit 211 detects that the robot 1 is actually tilted to the left by the predetermined angle (YES in S507), the processing performed by the main control unit 211 proceeds to S508. That is, the processes in S506 and S507 continue until the main control unit 211 detects that the robot 1 is actually tilted to the left by the predetermined angle.

Subsequently, the main control unit 211 outputs the left rotation control amount to the weight drive mechanism control unit 209 and outputs the acceleration control amount in the backward direction to the second drive mechanism control unit 208 (S508). As a result, as illustrated in FIG. 15, the robot 1 enters the pivot turn behavioral state "4".

Subsequently, the main control unit 211 monitors the measurement value output from the rotary encoder of the first motor 118 and detects whether the robot 1 has actually started moving backward (S509). Thereafter, if the main control unit 211 cannot detect that the robot 1 has actually started moving backward (NO in S509), the processing performed by the main control unit 211 returns to S508. However, if the main control unit 211 can detect that the robot 1 has actually started moving backward (YES in S509), the processing performed by the main control unit 211 proceeds to S510. That is, the processes in S508 and S509 continue until the main control unit 211 detects that the robot 1 has actually started moving backward.

Subsequently, the main control unit 211 outputs the stop control amount to the second drive mechanism control unit 208 (S510). In this manner, the backward movement of the robot 1 is stopped.

By repeating the flow of FIG. 22, the robot 1 repeats the pivot turn to make a turn by the unit turning angle.

Figure 23:
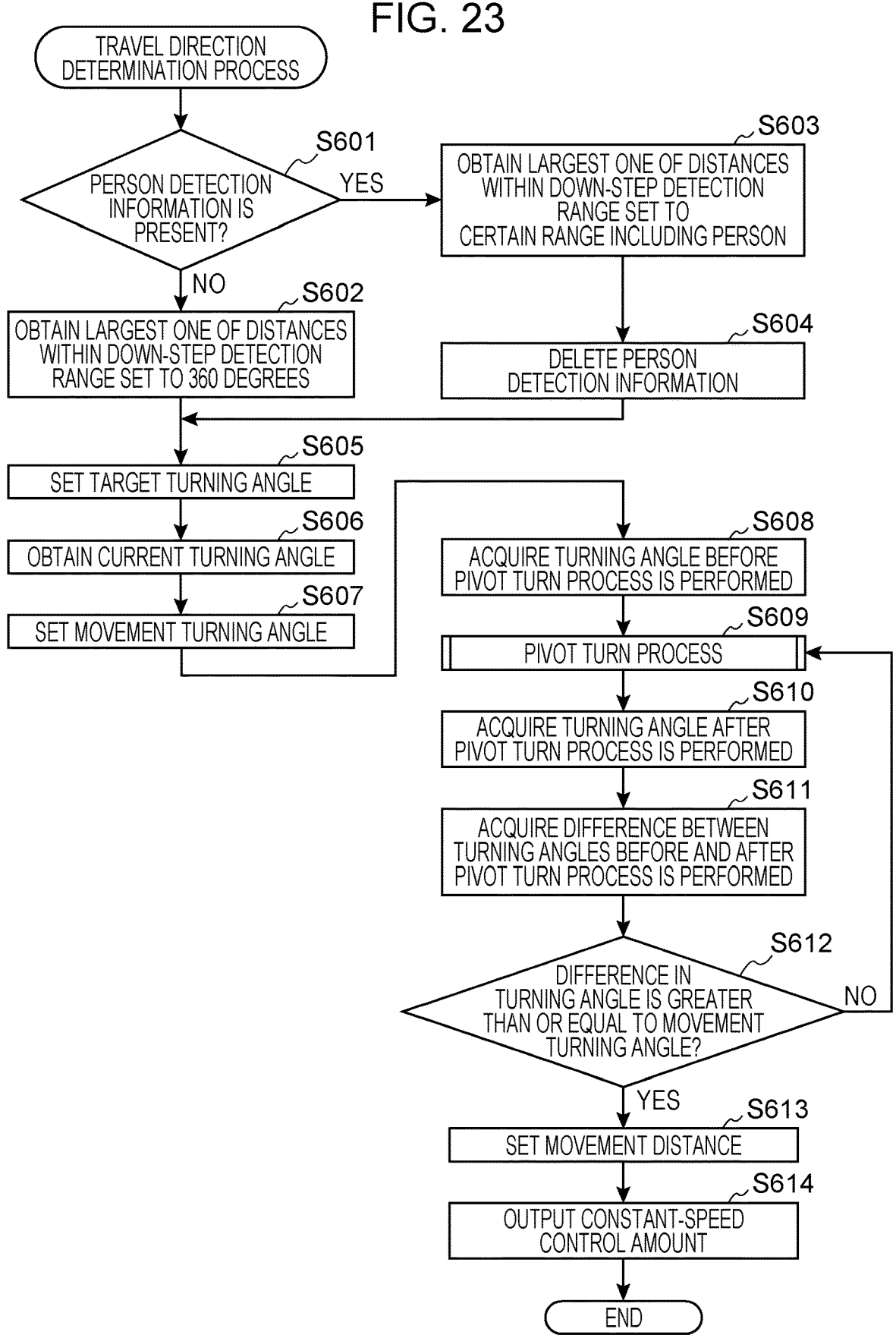
FIG. 23 is a flowchart illustrating the details of the travel direction determination process.

FIG. 23 is a flowchart illustrating the details of the travel direction determination process. The main control unit 211 determines whether the person detection information is present in the memory 202 first (S601). If the person detection information is not present (NO in S601), the main control unit 211 acquires the largest value of the distance from the down-step information table T14 generated on the basis of the down-step detection range set to 360 degrees (S602). However, if the person detection information is present (YES in S601), the largest one of the distances is acquired from the down-step information table T14 generated on the basis of the down-step detection range set to the certain range including the person (S603). Thereafter, the person detection information is deleted from the memory 202 (S604), and the processing proceeds to S605.

Subsequently, the main control unit 211 sets the direction defined by the turn difference angle θ corresponding to the largest value of the distance acquired in S602 or S603 as the target turning angle of the robot 1 (S605).

Subsequently, the main control unit 211 acquires the current turning angle of the robot 1 from the measurement value of the yaw angle output from the gyro sensor 155 (S606). Subsequently, the main control unit 211 sets the difference between the target turning angle set in S605 and the current turning angle acquired in S606 as a movement turning angle (S607).

Subsequently, the main control unit 211 acquires, from the gyro sensor 155, the turning angle before the pivot turn process is performed (S608). In this example, the measurement value of the yaw angle output from the gyro sensor 155 is acquired as the turning angle before the pivot turn process is performed.

Subsequently, the main control unit 211 performs the pivot turn process (S609). The pivot turn process has already been described in detail above with reference to FIG. 22.

Subsequently, the main control unit 211 acquires, from the gyro sensor 155, the turning angle after the pivot turn process is performed (S610). Thereafter, the main control unit 211 acquires the difference between the turning angles before and after the pivot turn process is performed, that is, the difference between the turning angle acquired in S608 and the turning angle acquired in S610 (S611).

Subsequently, if the difference in the turning angle acquired in S611 is less than the movement turning angle (NO in S612), the processing performed by the main control unit 211 returns to S609, where the main control unit 211 performs the pivot turn process again (S609).

However, if the difference in the turning angle acquired in S611 is greater than or equal to the movement turning angle (YES in S612), the robot 1 was able to turn through the movement turning angle and, thus, the main control unit 211 sets the movement distance (S613). At this time, for example, the main control unit 211 can set the movement distance to a value obtained by multiplying the largest value of the distance acquired in S602 or S603 by a coefficient k (for example, 0.5).

Subsequently, the main control unit 211 outputs, to the second drive mechanism control unit 208, a constant-speed control amount for moving the robot 1 forward at the first speed by the set movement distance (S614) and ends the processing. As a result, the robot 1 is moved in the direction corresponding to the largest value of the distance acquired in S602 or S603 at the first speed by the movement distance.

By repeating the processes from S609 to S612, the robot 1 turns through the movement turning angle.

As described above, according to the robot 1 of the present embodiment, each time the range finding sensor 105 rotates by the unit pitch angle, the distance from the robot 1 to an object located on a side the display portion is facing, that is, an object located in front of the robot 1 is measured. If the difference between the first distance previously measured and the second distance subsequently measured is larger than or equal to the first predetermined value, information indicating that there is a down-step the first distance ahead of the robot 1 in the direction defined by the turning angle of the robot 1 when the first distance is measured is stored in the memory 202.

In this manner, according to the present embodiment, a down-step can be detected by using the characteristic of the spherical robot that the optical axis of the range finding sensor 105 can be changed with the rotation of the first spherical cap portion 102 and the second spherical cap portion 103 in the pitch direction.

In addition, according to the present embodiment, when the main casing 101 is rotated toward a direction in which a down-step is located, the robot 1 is turned toward the direction in which the down-step is located through the pivot turn process.

Consequently, according to the present embodiment, the robot can be turned with a turning radius smaller than that in a normal turn to face the direction in which the down-step is located. As a result, according to the present embodiment, even when the robot 1 is positioned at a dangerous place from which the robot 1 is highly likely to fall (e.g., a corner of a desk), the robot 1 can be prevented from falling from the place by turning with a small turning radius.

Furthermore, according to the present embodiment, when moving the robot 1 in a direction in which a down-step is located, the main casing 101 is rolled forward by a distance smaller than the first distance which is the distance from the robot 1 to the down-step. Thus, the robot 1 can be prevented from falling from the down-step located ahead of the movement destination.

It should be noted that the present disclosure can provide the following modifications.

(1) In S605 of FIG. 23, the main control unit 211 selects, from among the directions registered in the down-step information table T14, the one for which the distance is the longest as a direction corresponding to the target turning angle of the robot 1. However, at this time, the main control unit 211 may determine the travel direction by selecting a direction in which a down-step is not located in preference to a direction in which a down-step is located. For example, in the case where a direction in which a down-step is located and a direction in which no down-step is located are registered in the down-step information table T14 and the same largest distances are registered for the two directions, the main control unit 211 can select the direction in which no down-step is located as the travel direction of the robot 1. At this time, an obstacle, such as a wall, is likely to be present in the direction in which no down-step is located. Accordingly, by determining the direction in which no down-step is located as the travel direction of the robot 1, the robot 1 can be prevented from falling from a down-step.

(2) In S605 of FIG. 23, the main control unit 211 may select the target turning angle of the robot 1 from the directions that are registered in the down-step information table T14 and that are directions other than the direction corresponding to the shortest distance. In this case, from among the turning difference angles θ corresponding to the distances other than the shortest distance registered in the down-step information table T14, the main control unit 211 can randomly select one and determine the direction defined by the determined turning difference angle θ as the target turning angle of the robot 1.

Even in the present modification, the main control unit 211 may determine the target turning angle by selecting a direction in which no down-step is located in preference to a direction in which a down-step is located. For example, in the down-step information table T14, the main control unit 211 can set the selection probability of a direction in which a down-step is located such that the selection probability is lower than that of a direction in which no down-step is located. Thereafter, the main control unit 211 can randomly select the target turning angle.

(3) In S605 of FIG. 23, the main control unit 211 may determine the target turning angle of the robot 1 from the directions that are registered in the down-step information table T14 and that correspond to distances greater than or equal to a predetermined distance. In this case, the main control unit 211 can randomly select one from among the turn difference angles θ corresponding to the distances that are registered in the down-step information table T14 and that are greater than or equal to the predetermined distance and determine the direction defined by the selected turn difference angle θ as the target turning angle of the robot 1. Note that as the predetermined distance, a value of 50 cm can be used, for example.

Even in the present modification, the main control unit 211 may determine the target turning angle by selecting a direction in which no down-step is located in preference to a direction in which a down-step is located. For example, in the down-step information table T14, the main control unit 211 can set the selection probability of a direction in which a down-step is located such that the selection probability is lower than that of a direction in which no down-step is located. Thereafter, the main control unit 211 can randomly select the target turning angle.

(4) In S605 of FIG. 23, the main control unit 211 determines the target turning angle of the robot 1 from the directions that are registered in the down-step information table T14 and that are directions other than the direction corresponding to the distance less than or equal to a predetermined distance. In this case, the main control unit 211 can randomly select one from among the turn difference angles θ corresponding to the distances that are registered in the down-step information table T14 and that are less than or equal to the predetermined distance and determine the direction defined by the selected turn difference angle θ as the target turning angle of the robot 1. Note that as the predetermined distance, a value of 30 cm can be used, for example.

Even in the present modification, the main control unit 211 may determine the target turning angle by selecting a direction in which no down-step is located in preference to a direction in which a down-step is located. For example, in the down-step information table T14, the main control unit 211 can set the selection probability of a direction in which a down-step is located so that the selection probability is lower than that of a direction in which no down-step is located. Thereafter, the main control unit 211 can randomly select the target turning angle.

(5) In the modification described in (1) above, to determine the target turning angle by selecting a direction in which no down-step is located (in this example, the direction in which an obstacle, such as a wall, is located) in preference to a direction in which a down-step is located, the main control unit 211 may employ the following technique. That is, the main control unit 211 obtains a first calculated value by multiplying the distance from the robot 1 to the down-step by a weight value W1 and obtains a second calculated value by multiplying the distance from the robot 1 to the obstacle including the wall by a weight value W2, where W1+W2=1, and W1<W2. Thereafter, the main control unit 211 may set, as the target turning angle, the turn difference angle θ corresponding to the largest one among the first calculated values and the second calculated values. According to the present modification, since W1<W2, the direction in which the obstacle, such as a wall, is located can be preferentially set as the target turning angle over the direction in which the down-step is located. As a result, the probability of the robot 1 moving toward the down-step becomes low and, thus, the robot 1 can be more reliably prevented from falling from the down-step.

(6) In S605 of FIG. 23, the main control unit 211 may determine the target turning angle of the robot 1 from the distances that are registered in the down-step information table T14 and that are distances in the directions in which no down-step is located, that is, the directions in which an obstacle, such as a wall, is located. In this case, the main control unit 211 can select the largest distance from among the distances of "down-step=0" registered in the down-step information table T14 and determine, as the target turning angle, the direction corresponding to the selected largest distance.

(7) In the flowchart illustrated in FIG. 18, the processing is started when the robot is placed on the travel surface (S101). However, the present disclosure is not limited thereto. For example, the processing may be started when the robot 1 stops. In this case, according to the present disclosure, when the robot 1 stops, the down-step detection process can be started. If a direction in which a down-step is located is detected, the robot 1 can be moved in the direction in which the down-step is located. In this case, according to the present disclosure, the direction defined by a turn difference angle θ in which the distance from the robot 1 to the down-step is the largest can be set in the down-step information table T14 as the target turning angle. Thereafter, the robot 1 can be moved by a distance smaller than the distance from the robot 1 to the down-step in the direction corresponding to the target turning angle. In this manner, the robot 1 can be prevented form falling from the down-step.

(8) In the down-step detection process illustrated in FIG. 21, the presence or absence of a down-step is detected each time the turning angle is incremented by the unit turning angle. However, the present disclosure is not limited thereto. For example, the presence or absence of a down-step may be detected for only the frontward direction of the robot 1. In this case, according to the present disclosure, if the distance from the robot 1 to the down-step is less than a predetermined distance, the robot 1 can be turned only through a unit turning angle and, thereafter, the presence or absence of a down-step can be detected. However, if the distance from the robot 1 to the down-step is greater than or equal to the predetermined distance, the robot 1 can be moved toward the down-step by a distance smaller than the distance from the robot 1 to the down-step. However, according to the present disclosure, if no down-step is detected in the frontward direction of the robot 1, it can be determined that an obstacle, such as a wall, is present in the frontward direction and the robot 1 can be moved by a distance that is smaller than the distance from the robot 1 to the obstacle.

(9) According to the present disclosure, when information indicating that there are down-steps in all directions is registered in the down-step information table T14 illustrated in FIG. 14 and if the presence of a person is not detected from the image data acquired by the camera 104 and the audio data acquired by the microphone 106, the robot 1 may be moved in a direction in which a down-step that is the farthest from the robot 1 is located by a distance that is smaller than the distance from the robot 1 to the down-step. In this case, when the robot 1 is placed on an object surrounded by down-steps (e.g., a desk), the robot 1 can continue to travel by the maximized distance while being prevented from falling from the down-step.

(10) In the flowchart illustrated in FIG. 18, the processing is started when the robot is placed on the travel surface (S101). However, the present disclosure is not limited thereto. For example, the processing may be started when any person is detected from the image data acquired by the camera 104 and the audio data acquired by the microphone 106. In this case, according to the present disclosure, the pivot turn process can be performed so that the front of the robot 1 is oriented to the person. Thereafter, the down-step detection process can be performed. If a down-step is detected, the robot 1 can be moved in the direction in which the person is positioned by a distance that is smaller than the distance from the robot 1 to the down-step.

According to the present disclosure, since the robot can be prevented from falling from a down-step, the robot is effective when used in a house which represents an environment with many down-steps.

What is claimed is:

1. A robot comprising:
 a first spherical cap portion;
 a second spherical cap portion;
 a spherical band-shaped main casing disposed between the first spherical cap portion and the second spherical cap portion, the main casing having a first flat surface to interface a flat surface of the first spherical cap portion, and a second flat surface to interface a flat surface of the second spherical cap portion;
 a first shaft that joins the first spherical cap portion to the second spherical cap portion;
 a display that is attached to the first shaft via an arm, and that displays at least part of a face of the robot in a forward direction;
 a weight that is provided inside of the main casing and that rotates around a second shaft of the weight that is disposed perpendicular to the first shaft;
 a first drive mechanism drives a rotation of the first shaft to rotate the first spherical cap portion and the second spherical cap portion;
 a second drive mechanism independent from the first drive mechanism, the second drive mechanism drives a rotation of the main casing about the first shaft to cause a linear movement of the robot, the linear movement including a movement in the forward direction and a movement in a backward direction;
 a weight drive mechanism that rotates the weight around the second shaft;
 a range finding sensor disposed in one of the first spherical cap portion and the second spherical cap portion to face in a same direction as the display;
 a gyro sensor that measures a turning angle of the robot about an axis perpendicular to a plane including the first shaft and detects a shaking movement of the robot;
 a memory; and
 a control circuit that:
  controls the first drive mechanism to rotate the range finding sensor around the first shaft in at least one of an upward direction and a downward direction in increments of a predetermined angle,
  wherein the range finding sensor measures a distance from the range finding sensor to an object facing the display of the robot each time the range finding sensor rotates through the predetermined angle,
  wherein, if a difference between a first distance between the range finding sensor and the object previously measured and a second distance between the range finding sensor and the object subsequently measured is greater than or equal to a first predetermined value, the control circuit stores, in the memory, information indicating that there is a down-step in a direction defined by the turning angle of the robot when the first distance is measured at a position having the first distance away from the range finding sensor,
  wherein in order to rotate the main casing and move the main casing in a direction in which the down-step is located, the control circuit performs following operations a predetermined number of times:
   controlling the second drive mechanism to stop the rotation of the main casing,
   controlling the weight drive mechanism to tilt the weight towards a first side that is in a direction towards one of the first spherical cap or the second spherical cap,
   controlling the second drive mechanism to start a rotation of the main casing to move the main casing forward with the weight tilted to the first side,
   controlling the second drive mechanism to stop the rotation of the main casing,
   tilting the weight to a second side different from the first side, and
   controlling the second drive mechanism to start a rotation of the main casing to move the main casing backward with the weight tilted to the second side, so that the robot turns in the direction in which the down-step is located, and
  wherein the control circuit subsequently rotates the main casing so that the main casing moves forward in the direction in which the down-step is located by a distance that is smaller than the first distance.

2. The robot according to claim 1, wherein, if a value indicating a shaking movement of the robot is detected by the gyro sensor and the value remains unchanged for a predetermined period of time, the control circuit determines that the robot is placed on a flat surface, and
 wherein the control circuit controls the second drive mechanism to stop the linear movement of the robot and controls the weight drive mechanism to stop a rotation of the weight, and the range finding sensor measures the distance from the range finding sensor to the object facing the display each time the range finding sensor rotates through the predetermined angle.

3. The robot according to claim 1, wherein, if the difference between the first distance and the second distance is less than the first predetermined value, the control circuit stores, in the memory, information indicating that there is no down-step in a direction defined by the turning angle of the robot when the first distance is measured.

4. The robot according to claim 1, wherein the control circuit determines that the robot is placed on a flat surface if a value indicating the shaking movement of the robot is detected by the gyro sensor and the value remains unchanged for a predetermined period of time, controls the second drive mechanism to stop the linear movement of the robot, and controls the weight drive mechanism to stop a rotation of the weight, wherein a first turning angle is defined as a turning angle of the robot when the rotation of the weight is stopped with the linear movement of the robot stopped, wherein, in order to rotate the robot from a position corresponding to the first turning angle to a position corresponding to a second turning angle representing a next turning angle obtained by adding a predetermined unit of turning angle to the first turning angle, and determine whether the down-step is located in a direction corresponding to the second turning angle, the control circuit performs following operations a predetermined number of times:

controlling the second drive mechanism to stop the rotation of the main casing, controlling the weight drive mechanism to tilt the weight to the first side, controlling the second drive mechanism to start a rotation of the main casing to move the main casing forward with the weight tilted to the first side, controlling the second drive mechanism to stop the rotation of the main casing, tilting the weight to a second side different from the first side, controlling the second drive mechanism to start a rotation of the main casing to move the main casing backward with the weight tilted to the second side, so that the robot is turned to face the direction corresponding to the second turning angle, wherein the control circuit subsequently controls the first drive mechanism to rotate the range finding sensor around the first shaft in at least one of the upward direction and downward direction in increments of the predetermined angle, and wherein the range finding sensor measures the distance from the range finding sensor to the object facing the display each time the range finding sensor rotates through the predetermined angle.

5. The robot according to claim 4, wherein, when the control circuit determines that the robot is placed on the flat surface and defines the first turning angle as the turning angle of the robot when stopping the rotation of the weight with the linear movement of the robot stopped, the control circuit continues to determine whether there is a down-step is present until the robot turns 360 degrees from the first turning angle in increments of the predetermined unit of turning angle.

6. The robot according to claim 5, further comprising:
a camera that captures an image of an environment surrounding the robot; and
a microphone that acquires a sound signal emanating from the environment surrounding the robot,
wherein, if the control circuit determines that an image of a person is not included in the image captured by the camera and voice of the person is not included in the sound signal acquired by the microphone, and that one or more down-steps are located within 360 degree of the robot, the control circuit rotates the main casing and moves the main casing forward, from a current position of the robot in a direction in which a farthest down-step from the current position of the robot is located, by a distance that is smaller than a distance from the current position of the robot to a position where the farthest down-step is located.

7. The robot according to claim 5, further comprising:
a camera that captures an image of an environment surrounding the robot; and
a microphone that acquires a sound signal emanating from the environment surrounding the robot,
wherein, if the control circuit determines that there is no down-step within 360 degree of the robot and that an image of a person is not included in the acquired image and voice of the person is not included in the acquired sound signal, the control circuit determines whether an obstacle is present in a direction in which the main casing is rotated and moved forward by using the range finding sensor,
wherein, if the control circuit determines that the obstacle is present in the direction in which the main casing is moved forward after its rotation, the control circuit determines whether a distance from the robot to the obstacle is less than a second predetermined value,
wherein, if the distance from the robot to the obstacle is less than the second predetermined value, the control circuit controls the second drive mechanism to reduce a speed of the robot from a first speed used to move the robot forward to a second speed lower than the first speed, and controls the weight drive mechanism to tilt the weight to the first side to turn the robot with a second turning radius that is larger than a first turning radius, and
wherein the first turning radius is a turning radius of the robot that is used to determine whether a down-step is present until the robot turns 360 degrees from the first turning angle in increments of the predetermined unit of turning angle.

8. The robot according to claim 7, wherein the control circuit controls the second drive mechanism to move the robot forward in accordance with a deceleration control amount for moving the robot forward at the second speed and controls the weight drive mechanism to tilt the weight to the first side in accordance with a first rotation control amount, and
wherein the first rotation control amount is a rotation control amount used to control the weight drive mechanism to tilt the weight to the first side with the linear movement of the robot stopped by controlling the second drive mechanism in accordance with a stop control amount used to stop the rotation of the main casing.

9. The robot according to claim 5, further comprising:
a camera that captures an image of an environment surrounding the robot; and
a microphone that acquires a sound signal from the environment surrounding the robot,
wherein, if the control circuit determines that no down-step is present within a 360 degree rotational direction of the robot and that an image of a person is included in the acquired image or voice of the person is included in the acquired sound signal, the control circuit controls the second drive mechanism to move the robot forward in a direction in which the person is positioned at the first speed used to move the robot forward.

10. The robot according to claim 9, wherein the control circuit determines whether voice of the person corresponding to a voice instruction to the robot is included in the sound signal acquired by the microphone within a predetermined period of time after rotating the main casing and moving the main casing forward by a distance that is smaller than the first distance,
wherein, if the control circuit determines that the voice instruction to the robot is included in the sound signal acquired by the microphone, the control circuit executes a task corresponding to the instruction.

11. The robot according to claim 1, further comprising:
a camera that captures an image of an environment surrounding the robot; and
a microphone that acquires a sound signal emanating from the environment surrounding the robot,
wherein, after rotating the main casing and moving the main casing forward in the direction in which the down-step is located by a distance that is smaller than the first distance, the control circuit determines whether an image of a person is included in the image captured by the camera or voice of the person is included in the sound signal acquired by the microphone,
wherein, if the control circuit determines that the image of the person is included in the image captured by the camera or the voice of the person is included in the sound signal acquired by the microphone, the control circuit performs following operation a predetermined number of times:
controlling the second drive mechanism to stop rotation of the main casing,
controlling the weight drive mechanism to tilt the weight to the first side,
controlling the second drive mechanism to start rotation of the main casing to move the main casing forward with the weight tilted to the first side,
controlling the second drive mechanism to stop the rotation of the main casing,
tilting the weight to a second side different from the first side, and
controlling the second drive mechanism to stat rotation of the main casing to move the main casing backward with the weight tilted to the second side, so that the robot is turned to a predetermined turning angle corresponding to a direction in which the person is positioned,
wherein the control circuit subsequently controls the first drive mechanism to rotate the range finding sensor around the first shaft in at least one of an upward direction and a downward direction in increments of a predetermined angle,
wherein the range finding sensor measures the distance from the range finding sensor to the object facing the display each time the range finding sensor rotates through the predetermined angle,
wherein, if a difference between a third distance previously measured and a fourth distance subsequently measured is greater than or equal to a predetermined value, the control circuit determines that the down-step is located in a direction defined by the turning angle of the robot when the third distance is measured at a position that is separated by the third distance away from the range finding sensor, and
wherein the control circuit subsequently rotates the main casing and moves the main casing forward by a distance that is smaller than the third distance.

12. The robot according to claim 1, wherein the control circuit controls the second drive mechanism to stop the linear movement of the robot in accordance with a stop control amount for stopping the rotation of the main casing, controls the weight drive mechanism to tilt the weight to the first side in accordance with a first rotation control amount, controls the second drive mechanism to start a rotation of the main casing to cause a forward movement of the robot in accordance with a first acceleration control amount for rotating the main casing with the weight tilted to the first side, controls the second drive mechanism to stop the forward movement of the robot, controls the weight drive mechanism to tilt the weight to the second side in accordance with a second rotation control amount that is a control amount in a direction opposite to a direction of the first rotation control amount, and controls the second drive mechanism to start a rotation of the main casing to cause a backward movement of the robot with the weight tilted to the second side in accordance with a second control amount having a same control amount as the first acceleration control amount.

13. A robot comprising:
a first spherical cap portion;
a second spherical cap portion;
a spherical band-shaped main casing disposed between the first spherical cap portion and the second spherical cap portion, the main casing having a first flat surface to interface a flat surface of the first spherical cap portion, and a second flat surface to interface a flat surface of the second spherical cap portion;
a first shaft that joins the first spherical cap portion to the second spherical cap portion;
a display that is attached to the first shaft via an arm and that displays at least part of a face of the robot in a forward direction;
a weight that is provided inside of the main casing and that rotates around a second shaft of the weight that is disposed perpendicular to the first shaft;
a first drive mechanism drives a rotation of the first shaft to rotate the first spherical cap portion and the second spherical cap portion;
a second drive mechanism independent from the first drive mechanism, the second drive mechanism drives a rotation of the main casing about the first shaft to cause a linear movement of the robot, the linear movement including a movement in the forward direction and a movement in a rear direction;
a weight drive mechanism that rotates the second shaft;
a range finding sensor disposed in one of the first spherical cap portion and the second spherical cap portion to face in a same direction as the display;
a gyro sensor that measures a turning angle of the robot about an axis perpendicular to a plane including the first shaft and detects a shaking movement of the robot;
a camera that captures an image of an environment surrounding the robot;
a microphone that acquires a sound signal emanating from the environment surrounding the robot;
a memory; and
a control circuit,
wherein, if the control circuit determines that an image of a person is included in the image captured by the camera or voice of the person is included in the sound signal acquired by the microphone, the control circuit performs following operation a predetermined number of times:
controlling the second drive mechanism to stop the rotation of the main casing,
controlling the weight drive mechanism to tilt the weight to a first side that is in a direction towards one of the first spherical cap or the second spherical cap,
controlling the second drive mechanism to start a rotation of the main casing to move the main casing forward with the weight tilted to the first side,
controlling the second drive mechanism to stop the rotation of the main casing, tilting the weight to a second side different from the first side, and controlling the second drive mechanism to start a rotation of the main casing to move the main casing backward with the weight tilted to the second side, so that the robot is turned to a predetermined turning angle corresponding to a direction in which the person is positioned, wherein the control circuit subsequently controls the first drive mechanism to rotate the range finding sensor around the first shaft in at least one of an upward direction and a downward direction in increments of a predetermined angle, wherein the range finding sensor measures a distance from the range finding sensor to an object facing the display each time the range finding sensor rotates through the predetermined angle, wherein, if a difference between a first distance between the range finding sensor and the object previously measured and a second distance between the range finding sensor and the object subsequently measured is greater than or equal to a predetermined value, the control circuit determines that a down-step is located in a direction defined by the turning angle of the robot when the first distance is measured at a position the first distance away from the range finding sensor, and wherein the control circuit subsequently rotates the main casing and moves the main casing forward by a distance that is smaller than the first distance.

14. The robot according to claim 13, wherein the control circuit determines whether the voice of the person corresponding to a voice instruction to the robot is included in the sound signal acquired by the microphone within a predetermined period of time after rotating the main casing and moving the main casing forward by the distance that is smaller than the first distance, and wherein, if the control circuit determines that the voice instruction to the robot is included in the sound signal acquired by the microphone, the control circuit executes a task corresponding to the instruction.

* * * * *